(12) United States Patent
Roberts et al.

(10) Patent No.: US 9,571,784 B2
(45) Date of Patent: Feb. 14, 2017

(54) MEDIA CONTENT WATCH LIST SYSTEMS AND METHODS

(75) Inventors: Brian F. Roberts, Dallas, TX (US); George M. Higa, Dallas, TX (US); Joseph M. Geiger, Clinton, MA (US); Jayson Sellers, Carrollton, TX (US); Donald H. Relyea, Dallas, TX (US); Greg A. Johns, Irving, TX (US); Heath Stallings, Colleyville, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1227 days.

(21) Appl. No.: 12/609,302

(22) Filed: Oct. 30, 2009

(65) Prior Publication Data
US 2011/0107374 A1  May 5, 2011

(51) Int. Cl.
| | |
|---|---|
| G06F 3/00 | (2006.01) |
| G06F 13/00 | (2006.01) |
| H04N 5/445 | (2011.01) |
| H04N 5/765 | (2006.01) |
| H04N 5/76 | (2006.01) |
| H04N 21/258 | (2011.01) |
| H04N 21/482 | (2011.01) |
| H04N 21/25 | (2011.01) |
| H04N 21/426 | (2011.01) |
| H04N 21/658 | (2011.01) |
| H04N 9/82 | (2006.01) |
| H04N 21/442 | (2011.01) |

(Continued)

(52) U.S. Cl.
CPC .......... *H04N 5/765* (2013.01); *H04N 5/44543* (2013.01); *H04N 5/76* (2013.01); *H04N 21/251* (2013.01); *H04N 21/25833* (2013.01); *H04N 21/25891* (2013.01); *H04N 21/42684* (2013.01); *H04N 21/4826* (2013.01); *H04N 21/6582* (2013.01); *H04N 9/8205* (2013.01); *H04N 21/44204* (2013.01); *H04N 21/4788* (2013.01); *H04N 21/47214* (2013.01)

(58) Field of Classification Search
USPC .............................................. 725/37–61, 48
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |

(Continued)

*Primary Examiner* — Kunal Langhnoja

(57) ABSTRACT

Exemplary media content watch list systems and methods are disclosed. An exemplary method includes a media content watch list subsystem maintaining media content watch list data representing a plurality of media content instances available for experiencing by a user, receiving a request for a media content watch list from a media content access device associated with the user, generating the media content watch list based on the media content watch list data and the request, and transmitting data representative of the media content watch list to the media content access device for presentation to the user. The maintaining of the media content watch list data includes updating the media content watch list data based on at least one predetermined non-watch-list-specific operation performed by the media content access device associated with the user. Corresponding systems and methods are also disclosed.

17 Claims, 18 Drawing Sheets

(51) Int. Cl.
*H04N 21/472* (2011.01)
*H04N 21/4788* (2011.01)

(56) References Cited

U.S. PATENT DOCUMENTS

| | | | |
|---|---|---|---|
| 5,307,173 | A | 4/1994 | Yuen et al. |
| 5,335,079 | A | 8/1994 | Yuen et al. |
| 5,353,121 | A | 10/1994 | Young et al. |
| 5,382,983 | A | 1/1995 | Kwoh et al. |
| 5,479,266 | A | 12/1995 | Young et al. |
| 5,479,268 | A | 12/1995 | Young et al. |
| 5,499,103 | A | 3/1996 | Mankovitz |
| 5,512,963 | A | 4/1996 | Mankovitz |
| 5,515,173 | A | 5/1996 | Mankovitz et al. |
| 5,532,732 | A | 7/1996 | Yuen et al. |
| 5,532,754 | A | 7/1996 | Young et al. |
| 5,541,738 | A | 7/1996 | Mankovitz |
| 5,550,576 | A | 8/1996 | Klosterman |
| 5,553,123 | A | 9/1996 | Chan et al. |
| 5,559,550 | A | 9/1996 | Mankovitz |
| 5,600,711 | A | 2/1997 | Yuen |
| 5,619,274 | A | 4/1997 | Roop et al. |
| 5,640,484 | A | 6/1997 | Mankovitz |
| 5,684,525 | A | 11/1997 | Klosterman |
| 5,701,383 | A | 12/1997 | Russo et al. |
| 5,706,145 | A | 1/1998 | Hindman et al. |
| 5,727,060 | A | 3/1998 | Young |
| 5,734,786 | A | 3/1998 | Mankovitz |
| 5,790,198 | A | 8/1998 | Roop et al. |
| 5,801,787 | A | 9/1998 | Schein et al. |
| 5,808,608 | A | 9/1998 | Young et al. |
| 5,809,204 | A | 9/1998 | Young et al. |
| 5,812,205 | A | 9/1998 | Milnes et al. |
| 5,828,945 | A | 10/1998 | Klosterman |
| 5,870,150 | A | 2/1999 | Yuen |
| 5,872,588 | A * | 2/1999 | Aras et al. .................... 725/14 |
| 5,886,746 | A | 3/1999 | Yuen et al. |
| 5,915,026 | A | 6/1999 | Mankovitz |
| 5,923,362 | A | 7/1999 | Klosterman |
| 5,940,073 | A | 8/1999 | Klosterman et al. |
| 5,949,954 | A | 9/1999 | Young et al. |
| 5,959,688 | A | 9/1999 | Schein et al. |
| 5,969,748 | A | 10/1999 | Casement et al. |
| 5,970,206 | A | 10/1999 | Yuen et al. |
| 5,974,222 | A | 10/1999 | Yuen et al. |
| 5,987,213 | A | 11/1999 | Mankovitz et al. |
| 5,988,078 | A | 11/1999 | Levine |
| 5,991,498 | A | 11/1999 | Young |
| 6,002,394 | A | 12/1999 | Schein et al. |
| 6,016,141 | A | 1/2000 | Knudson et al. |
| 6,028,599 | A | 2/2000 | Yuen et al. |
| 6,049,652 | A | 4/2000 | Yuen et al. |
| 6,052,145 | A | 4/2000 | Macrae et al. |
| 6,072,983 | A | 6/2000 | Klosterman |
| 6,075,551 | A | 6/2000 | Berezowski et al. |
| 6,075,575 | A | 6/2000 | Schein et al. |
| 6,078,348 | A | 6/2000 | Klosterman et al. |
| 6,091,882 | A | 7/2000 | Yuen et al. |
| 6,118,492 | A | 9/2000 | Milnes et al. |
| 6,133,909 | A | 10/2000 | Schein et al. |
| 6,137,950 | A | 10/2000 | Yuen |
| 6,144,401 | A | 11/2000 | Casement et al. |
| 6,151,059 | A | 11/2000 | Schein et al. |
| 6,167,188 | A | 12/2000 | Young et al. |
| 6,177,931 | B1 | 1/2001 | Alexander et al. |
| 6,216,265 | B1 | 4/2001 | Roop et al. |
| 6,239,794 | B1 | 5/2001 | Yuen et al. |
| 6,247,176 | B1 | 6/2001 | Schein et al. |
| 6,262,722 | B1 | 7/2001 | Allison et al. |
| 6,263,501 | B1 | 7/2001 | Schein et al. |
| 6,323,911 | B1 | 11/2001 | Schein et al. |
| 6,341,195 | B1 | 1/2002 | Mankovitz et al. |
| 6,341,374 | B2 | 1/2002 | Schein et al. |
| 6,388,714 | B1 | 5/2002 | Schein et al. |
| 6,396,546 | B1 | 5/2002 | Alten et al. |
| 6,412,110 | B1 | 6/2002 | Schein et al. |
| 6,430,358 | B1 | 8/2002 | Yuen et al. |
| 6,430,359 | B1 | 8/2002 | Yuen et al. |
| 6,453,471 | B1 | 9/2002 | Klosterman |
| 6,460,181 | B1 | 10/2002 | Donnelly |
| 6,466,734 | B2 | 10/2002 | Yuen et al. |
| 6,469,753 | B1 | 10/2002 | Klosterman et al. |
| 6,477,705 | B1 | 11/2002 | Yuen et al. |
| 6,498,895 | B2 | 12/2002 | Young et al. |
| 6,505,348 | B1 | 1/2003 | Knowles et al. |
| 6,538,701 | B1 | 3/2003 | Yuen |
| 6,549,719 | B2 | 4/2003 | Mankovitz |
| 6,564,379 | B1 | 5/2003 | Knudson et al. |
| 6,567,606 | B2 | 5/2003 | Milnes et al. |
| 6,588,013 | B1 | 7/2003 | Lumley et al. |
| 6,668,133 | B2 | 12/2003 | Yuen et al. |
| 6,687,906 | B1 | 2/2004 | Yuen et al. |
| 6,732,369 | B1 | 5/2004 | Leftwich et al. |
| 6,742,183 | B1 | 5/2004 | Reynolds et al. |
| 6,745,391 | B1 | 6/2004 | Macrae et al. |
| 6,756,997 | B1 | 6/2004 | Ward et al. |
| 6,760,537 | B2 | 7/2004 | Mankovitz |
| 6,799,326 | B2 | 9/2004 | Boylan et al. |
| 6,799,327 | B1 | 9/2004 | Reynolds et al. |
| 6,850,693 | B2 | 2/2005 | Young et al. |
| 6,859,799 | B1 | 2/2005 | Yuen |
| 7,039,935 | B2 | 5/2006 | Knudson et al. |
| 7,069,576 | B1 | 6/2006 | Knudson et al. |
| 7,487,529 | B1 | 2/2009 | Orlick |
| 2001/0029610 | A1 | 10/2001 | Corvin et al. |
| 2001/0047298 | A1 | 11/2001 | Moore et al. |
| 2001/0054181 | A1 | 12/2001 | Corvin |
| 2002/0073424 | A1 | 6/2002 | Ward et al. |
| 2002/0124255 | A1 | 9/2002 | Reichardt et al. |
| 2003/0005445 | A1 | 1/2003 | Schein et al. |
| 2003/0056219 | A1 | 3/2003 | Reichardt et al. |
| 2003/0110495 | A1 | 6/2003 | Bennington et al. |
| 2003/0110499 | A1 | 6/2003 | Knudson et al. |
| 2003/0115599 | A1 | 6/2003 | Bennington et al. |
| 2003/0115602 | A1 | 6/2003 | Knee et al. |
| 2003/0163813 | A1 | 8/2003 | Klosterman et al. |
| 2003/0164858 | A1 | 9/2003 | Klosterman et al. |
| 2003/0188310 | A1 | 10/2003 | Klosterman et al. |
| 2003/0188311 | A1 | 10/2003 | Yuen et al. |
| 2003/0196201 | A1 | 10/2003 | Schein et al. |
| 2003/0204847 | A1 | 10/2003 | Ellis et al. |
| 2003/0208756 | A1 | 11/2003 | Macrae et al. |
| 2004/0010806 | A1 | 1/2004 | Yuen et al. |
| 2004/0045025 | A1 | 3/2004 | Ward et al. |
| 2004/0107437 | A1 | 6/2004 | Reichardt et al. |
| 2004/0117635 | A1* | 6/2004 | Karaoguz et al. ............ 713/182 |
| 2004/0168189 | A1 | 8/2004 | Reynolds et al. |
| 2004/0194138 | A1 | 9/2004 | Boylan et al. |
| 2004/0261098 | A1 | 12/2004 | Macrae et al. |
| 2005/0010949 | A1 | 1/2005 | Ward et al. |
| 2005/0028201 | A1 | 2/2005 | Klosterman et al. |
| 2005/0125823 | A1 | 6/2005 | McCoy et al. |
| 2005/0149964 | A1 | 7/2005 | Thomas et al. |
| 2005/0155056 | A1 | 7/2005 | Knee et al. |
| 2005/0216936 | A1 | 9/2005 | Knudson et al. |
| 2005/0251824 | A1 | 11/2005 | Thomas et al. |
| 2006/0156336 | A1 | 7/2006 | Knudson et al. |
| 2006/0212894 | A1 | 9/2006 | Knudson et al. |
| 2006/0277574 | A1 | 12/2006 | Schein et al. |
| 2006/0288366 | A1 | 12/2006 | Boylan et al. |
| 2007/0016926 | A1 | 1/2007 | Ward et al. |
| 2007/0033613 | A1 | 2/2007 | Ward et al. |
| 2007/0107010 | A1 | 5/2007 | Jolna et al. |
| 2007/0157220 | A1* | 7/2007 | Cordray et al. .................. 725/9 |
| 2008/0201748 | A1* | 8/2008 | Hasek et al. .................... 725/98 |
| 2011/0030024 | A1* | 2/2011 | Pasko et al. .................. 725/116 |
| 2011/0078717 | A1* | 3/2011 | Drummond et al. ........... 725/14 |
| 2011/0302620 | A1* | 12/2011 | Karaoguz et al. ............ 725/110 |
| 2012/0148217 | A1* | 6/2012 | Ellis et al. .................... 386/297 |

\* cited by examiner

MEDIA CONTENT WATCH LIST SYSTEMS AND METHODS

BACKGROUND INFORMATION

The advent of set-top boxes and other media content access devices has provided users of such devices with access to a large number and variety of media content programs, services, and choices. For example, a user may choose to experience a variety of distributed media content, including broadcast or multicast television programs, pay-per-view programming, video-on-demand programming, and audio programming via a set-top box.

Distributed media content is typically associated with a particular media content type, distribution platform, and/or distribution service. Consequently, it is not uncommon for a user who accesses distributed media content to have an experience that is restricted by compartmentalization of the media content by type, distribution platform, and/or distribution service. For example, the user may be limited to using a particular media content access device or type of device to access a particular type of media content. As another example, the user may be forced to drill down into a particular path of a hierarchical menu of an access device in order to gain access to a particular type of media content, only to have to drill down into another path of the hierarchical menu of the access device in order to gain access to another particular type of media content. In these and other ways, a user experience associated with accessing and consuming media content may be fragmented by compartmentalization of the media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
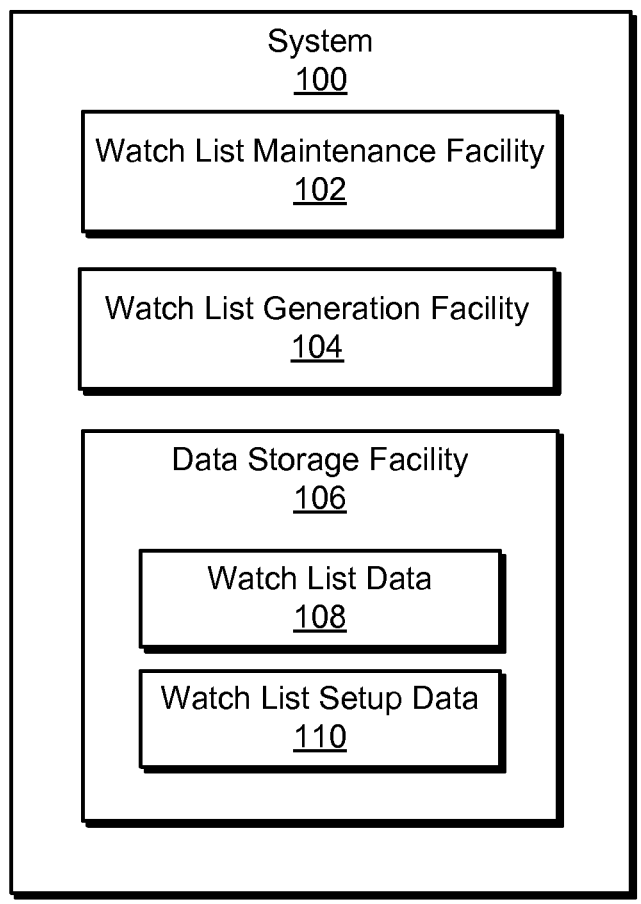
FIG. 1 illustrates an exemplary media content watch list system.

Exemplary media content watch list systems and methods are described herein. In certain exemplary systems and methods, media content watch list data representing one or more media content instances that are available for experiencing by a user via one or more media content access devices associated with the user may be maintained. In certain examples, the maintenance of the media content watch list data may include receiving the media content watch list data from the one or more media content access devices associated with the user, aggregating the media content watch list data, and storing the media content watch list data in a data storage facility, where the media content watch list data may be further maintained (e.g., updated) and used to generate one or more media content watch lists as described herein.

In certain exemplary systems and methods, a request for a media content watch list may be received from a media content access device, and the media content watch list may be generated based on the maintained media content watch list data and the request and transmitted to the media content access device. In certain examples, the media content watch list may be accessible by one or more media content access devices associated with the user, such that the user may access the media content watch list from any of the one or more media content access devices. In certain examples, the media content watch list may include data representing multiple media content instances of distinct types and/or distribution platforms. Examples of distinct types of media content and distinct media content distribution platforms are described further below.

As used herein, the term "media content" may refer generally to any content that may be accessed and/or presented by a media content access subsystem for experiencing by a user of the media content access subsystem. The term "media content instance" refers to any data record or object (e.g., an electronic file or set of electronic files) storing, including, or otherwise associated with media content, which may include data representative of a song, audio clip, movie, video, image, photograph, television program, on-demand media program, pay-per-view media program, broadcast media program (e.g., broadcast television program), multicast media program, narrowcast media program, a streamed and/or streaming media program, IPTV program, digital or Internet radio program, or any segment, component, or combination of these or other forms of content that may be experienced or otherwise accessed by a user. A media content instance may have any data format as may serve a particular application. For example, a media content instance may include an audio file having an MP3, WAV, AIFF, AU, or other suitable format, a video file having an MPEG, MPEG-2, MPEG-4, MOV, DMF, or other suitable format, an image file having a JPEG, BMP, TIFF, RAW, PNG, GIF or other suitable format, and/or a data file having any other suitable format.

Exemplary embodiments of media content watch list systems and methods will now be described in more detail with reference to the accompanying drawings.

FIG. 1 illustrates an exemplary media content watch list system 100 (or simply "system 100"). While an exemplary system 100 is shown in FIG. 1, the components and configuration of system 100 illustrated in FIG. 1 are not intended to be limiting. Additional or alternative components and/or configurations may be used in other embodiments. In certain alternative embodiments, for example, one or more of the components shown in FIG. 1 may be combined.

System 100 may include a watch list maintenance facility 102, a watch list generation facility 104, and a data storage facility 106 selectively and communicatively coupled one to another. Any suitable communication technologies, including any of the communication technologies mentioned herein, may be employed to facilitate communications between facilities 102-106.

Watch list maintenance facility 102 may be configured to maintain media content watch list data, which may include any electronic data representing information descriptive of or otherwise related to media content that is available to a user by way of one or more media content access devices associated with the user. For example, media content watch list data may include identifiers (e.g., program IDs), titles, summary descriptions, release dates, broadcast dates and/or times, cast information, credits, ratings, user ratings, genres, media content type indicators, media content distribution platform indicators, running times, start times, end times, availability status indicators (e.g., status indicators indicting whether media content is downloaded, recorded, purchases, rented or available to be downloaded, recorded, purchased, rented, or otherwise accessed and/or experienced), priority levels, and/or any other information descriptive of or otherwise related to one or more media content instances.

Watch list maintenance facility 102 may maintain media content watch list data by performing one or more operations on and/or related to the media content watch list data. For example, watch list maintenance facility 102 may be configured to receive media content watch list data from one or more media content access devices associated with a user and aggregate the received media content watch list data. Watch list maintenance facility 102 may store the aggregated media content watch list data to data storage facility 106 as watch list data 108. In some examples, watch list maintenance facility 102 may receive a portion of watch list data 108 from each of a plurality of media content access devices associated with a user, aggregate the portions of the media content watch list data received from the plurality of media content access devices, and store the aggregated portions of the media content watch list data as watch list data 108 in data storage facility 106.

Watch list maintenance facility 102 may additionally or alternatively maintain media content watch list data by updating the media content watch list data, which updating may include, without limitation, adding to, deleting from, and modifying the media content watch list data. In certain embodiments, the updating of the media content watch list data may be based at least in part on and/or may be performed in response to one or more predetermined non-watch-list-specific operations, such as one or more predetermined non-watch-list-specific operations performed by one or more media content access devices associated with the user. A "non-watch-list-specific operation" may include any operation that is not performed or initiated by watch list maintenance facility 102 and/or watch list generation facility 104, which may include or be implemented by a watch list user interface, a watch list software application, a watch list database, and/or another watch list facility. Hence, a non-watch-list-specific operation may include an operation that is part of non-watch-list-specific operations (e.g., normal operations) of a media content delivery or access device, which operations are separate and apart from a watch list facility within the media content delivery or access device.

To illustrate, a non-watch-list-specific operation may include a media content recording operation (e.g., a digital video recorder ("DVR") facility operation), an electronic media program guide operation (e.g., an electronic media program guide facility operation), a media-on-demand operation (e.g., a media-on-demand facility operation such as a video-on-demand facility operation), and a media content presentation operation (e.g., a media content presentation facility operation) performed by a media content access device. By way of a particular example, a predetermined non-watch-list-specific operation may include a playback of a media content instance, which is represented in the media content watch list data, by a media content access device for experiencing by a user. In response to the playback of the media content instance, watch list maintenance facility 102 may update the media content watch list data by, for example, deleting data representing the media content instance from the media content list data, changing a priority level associated with the media content instance in the media content watch list data, or prompting a user to indicate whether to keep or delete data representing the media content instance in/from the media content watch list data.

Several examples of updates to media content watch list data and corresponding non-watch-list-specific operations that may trigger the updates will now be described. In certain embodiments, an update to media content watch list data may include adding data representing a media content instance to the media content watch list data. The adding of data representing a media content instance may be automatically performed in response to any of a number of predetermined non-watch-list-specific operations, including, but not limited to, a recording of a media content instance (e.g., a recording of a live transmission of the media content instance by a media content access device), a scheduling of a recording of a media content instance, a detecting of a recording conflict involving a media content instance (e.g., a conflict between scheduled DVR recordings of media content instances), a receipt of a recommendation of a media content instance (e.g., a receipt of a recommendation provided by any suitable source, including another user (e.g., a friend utilizing a social networking website to provide a recommendation of a media content instance to a user), a media content service provider (e.g., a distributor of media content providing a recommendation of a media content instance to a user based on user activity), or a third-party media recommendation service), a bookmarking, rental, download, or purchase of a media content instance (e.g., a bookmarking, download, rental, or purchase of an on-demand or pay-per-view media content instance provided by an on-demand or pay-per-view media content distribution platform), a program guide reminder of a scheduled transmission of a media content instance, a user selection of a media content instance in a program guide graphical user interface ("GUI"), and a media content instance becoming newly available to a user (e.g., a posting of a media content instance to a website accessible by an access device of the user or an access device of the user obtaining (e.g., downloading) a copy of a media content instance).

In certain embodiments, an update to media content watch list data may include deleting data representing a media content instance from the media content watch list data. The deleting of data representing a media content instance may be automatically performed in response to any of a number of predetermined non-watch-list-specific operations, including, but not limited to, a playback of the media content instance in its entirety for experiencing by user and an expiration of the availability of the media content instance (e.g., an expiration of the availability of an on-demand or recorded media content instance). Alternatively, a non-watch-list-specific operation may trigger a providing of an option or a prompt to a user to delete data representing a media content instance from the media content watch list data, to "check off" the media content instance as "watched,"

or to keep data representing the media content instance with an "unwatched" status in the media content watch list data.

In certain embodiments, an update to media content watch list data may include modifying media content watch list data representing a media content instance. The modifying of data representing a media content instance may be automatically performed in response to any of a number of non-watch-list-specific operations, including, but not limited to, a partial playback of the media content instance for experiencing by a user and an upcoming expiration of the availability of the media content instance (e.g., the availability of an on-demand media content instance is set to expire on an upcoming date). In some examples, modifying of watch list data representing a media content instance may include changing a priority level of the media content instance in the watch list data. For example, the priority level may be upgraded to bias placement of watch list data representing the media content instance forward in a media content watch list (e.g., toward the top of the watch list) or downgraded to bias placement of watch list data representing the media content instance backward in a media content watch list (e.g., toward the bottom of the watch list). To illustrate, when a media content instance is partially played back or is nearing an upcoming expiration of availability, the priority level of the media content instance may be upgraded in the watch list data to bias placement of watch list data representing the media content instance forward in a media content watch list such that the next time the media content watch list is generated a user is more likely to notice the watch list data representing the media content instance and choose to experience or finish experiencing the media content instance (e.g., before it becomes unavailable).

The above-described non-watch-list-specific operations and corresponding automatic updates to watch list data are illustrative only. Any predetermined non-watch-list-specific operation may trigger automatic updating of watch list data maintained by watch list subsystem 204.

With watch list maintenance facility 102 configured to update media content watch list data based on one or more predetermined non-watch-list-specific operations, the media content watch list data may be automatically and continually updated by watch list maintenance facility 102 with minimal or no manual watch-list-specific input from a user. In certain embodiments, media content watch list data associated with a user may be automatically updated based on the user's normal interactions with and operations of one or more media content access devices associated with the user, without the user having to manually provide watch-list-specific user input to cause the media content watch list data to be updated. In other words, the user is able to go about normal, non-watch-list-specific operation of a media content access device, and watch list maintenance facility 102 may automatically maintain (e.g., update) media content watch list data based on the normal, non-watch-list-specific operation of the media content access device.

In addition or alternative to the updating of media content watch list data based on one or more predetermined non-watch-list-specific operations, in certain embodiments, the updating of media content watch list data may be based on one or more watch-list-specific operations. A "watch-list-specific operation" may include any operation that is performed or initiated by watch list maintenance facility 102 and/or watch list generation facility 104, which may include or be implemented by a watch list user interface, a watch list software application, a watch list database, and/or another watch list facility. In certain examples, a watch-list-specific operation may include receipt of watch-list-specific user input by a watch list facility, watch list user interface, and/or a media content access device associated with a user. For instance, watch-list-specific user input may be received through a user interface generated by or for a watch list facility. Such watch-list-specific user input may indicate one or more actions to be performed to update media content watch list data, such as adding to, deleting from, or otherwise modifying the media content watch list data. Accordingly, a user may manually manage media content watch list data. Examples of watch-list-specific user input may include, without limitation, user input indicating a watch list keyword to be used to search for matching media content instances, a request to add data associated with a user-selected media content instance to media content watch list data, a request to delete data associated with a user-selected media content instance from media content watch list data, a request to modify data associated with a user-selected media content instance in media content watch list data, and a request to change a priority level of a user-selected media content instance in media content watch list data.

Watch list generation facility 104 may be configured to receive a request for a media content watch list from one or more media content access devices, generate a media content watch list based on media content watch list data and the request, and initiate transmission of the media content watch list to the one or more media content access devices. Generation of a media content watch list may be performed in any suitable way based on the media content watch list data maintained by watch list maintenance facility 102 and on information included in the request. The request may specify one or more parameters to be used by watch list generation facility 104 to generate a media content watch list from the watch list data. Examples of such parameters may include, without limitation, a user identifier (e.g., a user profile identifier), a media content access device identifier, media content access device attribute information (e.g., information specifying one or more types of media content that can be processed by a media content access device), one or more parameters to be used to filter media content watch list data, and one or more parameters to be used to sort media content watch list data.

The generating of a media content watch list may include filtering, or otherwise selecting from, media content watch list data to identify data to be included in the media content watch list. The filtering may be performed in any suitable way and based on one or more parameters, including predetermined parameters (e.g., default filtering parameters or filtering parameters selected by a user during setup of watch list generation facility 104), runtime parameters (e.g., parameters selected by a user during operation of watch list generation facility 104), and/or parameters included in a request for the media content watch list. Examples of parameters that may be used to filter media content watch list data to generate a media content watch list may include, but are not limited to, user identifiers, media content access device identifiers, media content type parameters, watch list data categories (e.g., categories corresponding to sources of watch list data), contextual filter parameters (e.g., context data indicating a menu context or media content distribution platform from which a request for a watch list is initiated), a user mood indicator, a user activity indicator (e.g., an indication that a user is actively or passively experiencing media content or operating an access device), and any other parameters that may be used to selectively identify certain watch list data for inclusion in a media content watch list.

The generating of a media content watch list may include sorting media content watch list data included in the media content watch list. The sorting may be performed in any suitable way and based on one or more parameters, including predetermined parameters (e.g., default sorting parameters or sorting parameters selected by a user during setup of watch list generation facility 104), runtime parameters (e.g., parameters selected by a user during operation of watch list generation facility 104), and/or parameters included in a request for the media content watch list. Examples of parameters that may be used to sort media content watch list data to generate a media content watch list may include, but are not limited to, media content type parameters, watch list data categories (e.g., categories corresponding to sources of watch list data), contextual sorting parameters (e.g., context data indicating a menu context or media content distribution platform from which a request for a watch list is initiated), a user mood indicator, a user activity indicator, dates and/or times of addition of data to the watch list data (e.g., for sorting by reverse data added such that most recently added data is biased to the front of the watch list), title parameters (e.g., for alphabetical sorting by title), ratings parameters, user ratings parameters, priority levels (e.g., for sorting to bias data associated with expiring media content to the front of the watch list), media content duration parameters, media content release or broadcast dates, media content status parameters (e.g., for sorting by status such as biasing media content that is downloaded to an access device toward the front of the watch list), relevance parameters (e.g., parameters indicating potential relevance of media content to a user), and any other parameters that may be used to selectively order data in a media content watch list.

In certain embodiments, watch list generation facility 104 may be configured to dynamically generate a media content watch list in response to each request for a media content watch list. Accordingly, the media content watch list may be generated based on up-to-date media content watch list data maintained by media content maintenance facility 102 and may provide a user with a list of available media content instances to be considered for experiencing (e.g., a "what to watch" list). The watch list may include data representing media content instances that are of distinct types and/or that are available across distinct media content distribution platforms and/or access device platforms.

In certain embodiments, watch list maintenance facility 102 may provide one or more tools configured to facilitate user configuration of watch list maintenance facility 102 and/or watch list generation facility 104. For example, one or more tools may be provided that may be utilized by a user of an access device to select one or more non-watch-list-specific operations that trigger one or more updates to media content watch list data. A user-selected non-watch-list-specific operation may be defined as a predetermined non-watch-list-specific operation, the performance of which is configured to be detected and to trigger one or more updates to media content watch list data as described herein. In addition, in some examples, the one or more user configuration tools may be utilized by the user to define one or more relationships between non-watch-list-specific operations and one or more updates to media content watch list data such that the user may select a particular update that will be performed in response to a particular non-watch-list-specific operation.

In addition, in some examples, the one or more user configuration tools may be utilized by the user to define one or more filtering and/or sorting parameters, which predetermined filtering and/or sorting parameters may be used generate a media content watch list. Such user-configured non-watch-list-specific operations, relationships of the user-configured non-watch-list-specific operations with update operations, filtering parameters, and sorting parameters may be stored as watch list setup data 110 in data storage facility 106. Watch list setup data 110 may represent data that configures watch list maintenance facility 102 to perform certain watch list data maintenance functions in response to certain predetermined events including performance of one or more non-watch-list-specific operations, as well as data that configures watch list generation facility 104 to generate a media content watch list based on one or more predetermined filtering and/or sorting parameters. Examples of tools that may be provided to facilitate user configuration of watch list maintenance facility 102 and/or watch list generation facility 104 are described further below.

Data storage facility 112 may be configured to maintain watch list data 108, watch list setup data 110, and any other data as may serve a particular application. As mentioned, watch list data 108 may include any aggregate media content watch list data described herein, and watch list setup data 110 may include any setup data that configures one or more watch list data maintenance and/or generation operations described herein.

System 100, including facilities 102-106, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems.

One or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Common forms of computer-readable media include, for example, a floppy disk, flexible disk, hard disk, magnetic tape, any other magnetic medium, a CD-ROM, DVD, any other optical medium, a RAM, a DRAM a PROM, an EPROM, a FLASH-EEPROM, any other memory chip or cartridge, or any other medium from which a computer can read.

Figure 2:
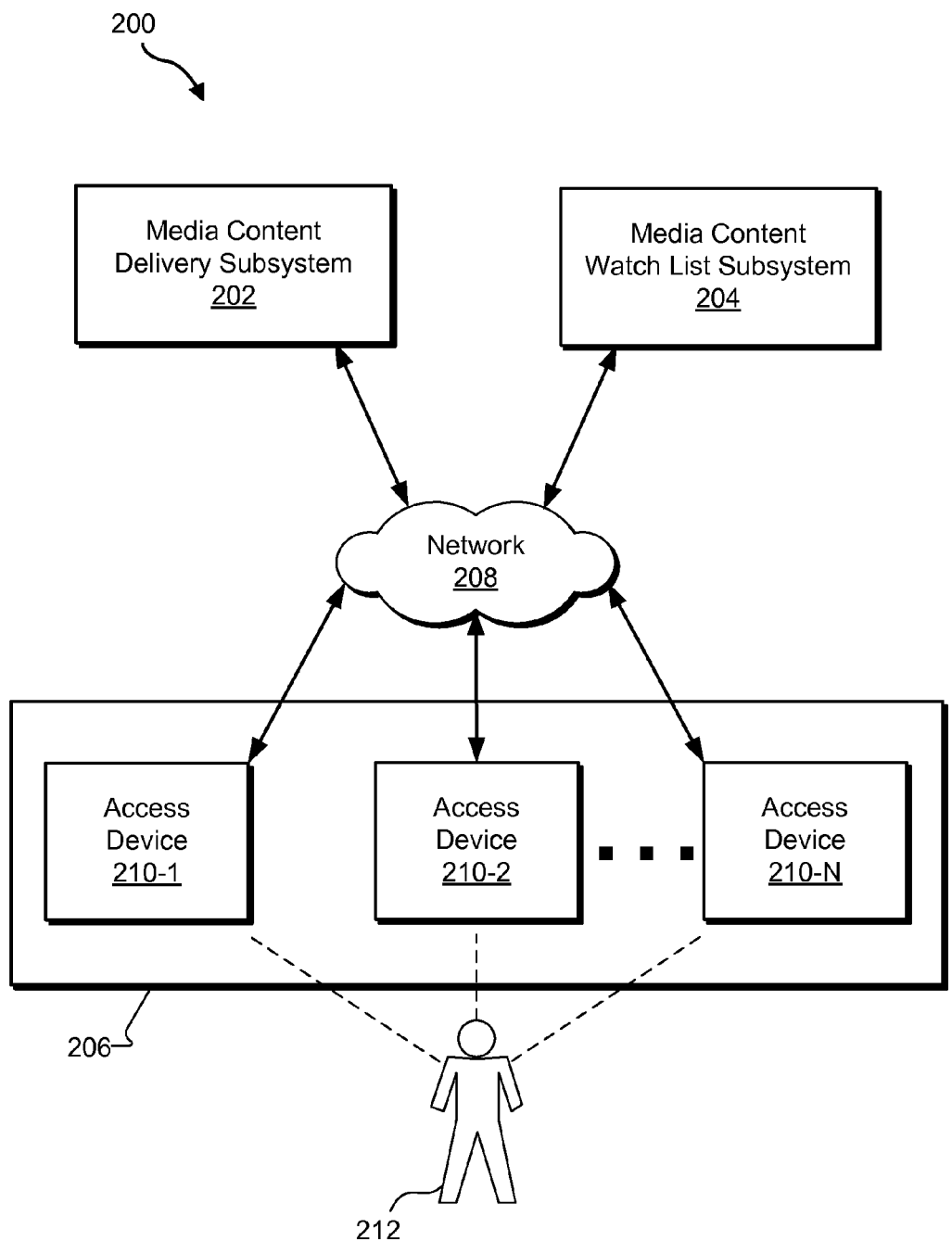
FIG. 2 illustrates an exemplary media content distribution system having the system of FIG. 1 implemented therein.

FIG. 2 illustrates an exemplary media content distribution system 200 (or simply "system 200") having the media content watch list system 100 of FIG. 1 implemented therein. As shown in FIG. 2, system 200 may include a media content delivery subsystem 202 (or simply "delivery subsystem 202"), a media content watch list subsystem 204 (or simply "watch list subsystem 204"), and a media content access subsystem 206 (or simply "access subsystem 206") in communication with one another via a network 208. Access subsystem 206 may include one or more media content access devices, such as access devices 210 (e.g., access devices 210-1 through 210-N), associated with a user 212 and configured to communicate with delivery subsystem 202 and watch list subsystem 204 via network 208.

While an exemplary media content distribution system 200 is shown in FIG. 2, the configuration of system 200 illustrated in FIG. 2 is not intended to be limiting. Additional or alternative configurations may be used in other embodiments. In certain alternative embodiments, for example, delivery subsystem 202 and watch list subsystem 204 may be integrated together and/or may be configured to communicate directly without going through network 208.

Delivery subsystem 202, watch list subsystem 204, and access devices 210 of access subsystem 206 may communicate using any suitable communication technologies, devices, networks, media, and protocols supportive of remote data communications. For example, delivery subsystem 202, watch list subsystem 204, and access devices 210 of access subsystem 206 may communicate over network 208 using any communication platforms and technologies suitable for transporting media content, media content watch list data, and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 208 may include one or more networks or types of networks (and communication links thereto) capable of carrying communications, media content, media content watch list data, and/or data signals between delivery subsystem 202, watch list subsystem 204, and access devices 210 of access subsystem 206. For example, network 208 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying media content, data, and/or communications signals between delivery subsystem 202, watch list subsystem 204, and access devices 210 of access subsystem 206. Communications between delivery subsystem 202, watch list subsystem 204, and access devices 210 of access subsystem 206 may be transported using any one of the above-listed networks, or any combination or subcombination of the above-listed networks.

In certain embodiments, one or more access devices 210 may utilize distinct data networks to transmit and receive media content watch list data to/from watch list subsystem 204. As an example, access device 210-1 may utilize a subscriber television network (e.g., an IP backchannel of a subscriber television network), access device 210-2 may utilize a mobile phone data network, and access device 210-N may utilize the Internet to transmit and receive media content watch list data to/from watch list subsystem 204. Such distinct data networks may be similarly utilized by one or more access devices 210 to access media content distributed delivery subsystem 202.

Delivery subsystem 202 may include or be implemented on any computing device or combination of computing devices configured to transmit and/or receive media content, communication signals, and/or data to/from one or more access devices 210 over network 208. Examples of such computing devices may include, without limitation, one or more servers (e.g., media transmission servers, video-on-demand ("VOD") servers, etc.), personal computers, media content transmission equipment, or the like. In some examples, delivery subsystem 202 may be configured to transmit (e.g., broadcast, multicast, and/or narrowcast) data representative of one or more media content instances to one or more access devices 210. Such data may be transmitted in one or more media content streams, as one or more data files, or in any other suitable manner as may serve a particular application.

Figure 3:
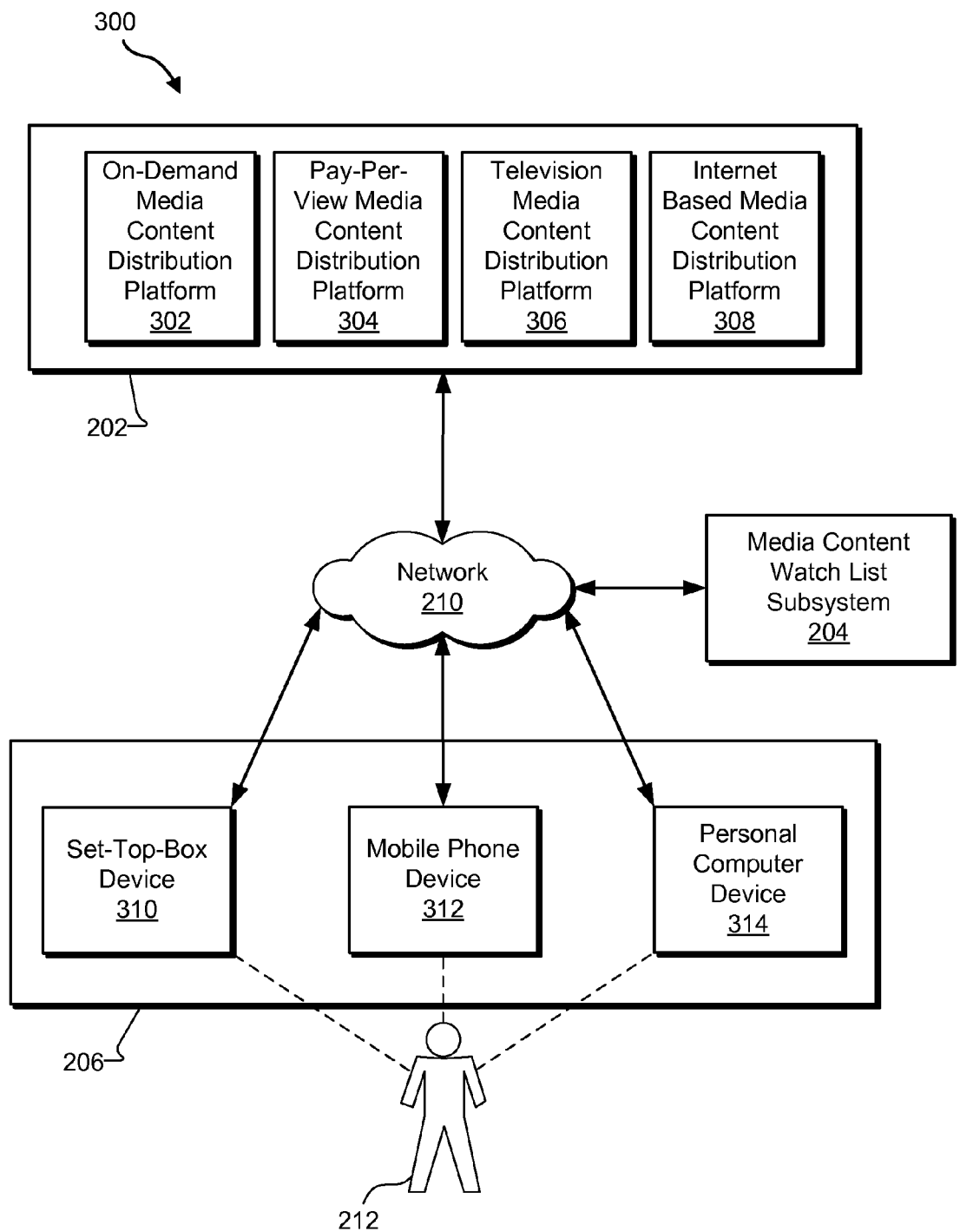
FIG. 3 illustrates an exemplary implementation of the system of FIG. 2.

Delivery subsystem 202 may include distinct media content distribution platforms for delivering media content to access device 210 via distinct media content distribution channels. For example, FIG. 3 illustrates an exemplary implementation 300 of system 200 in which delivery subsystem 202 includes distinct media content distribution platforms, namely an on-demand media content distribution platform 302, a pay-per-view media content distribution platform 304, a television media content distribution platform 306 (e.g., a broadcast or multicast television distribution platform), and an Internet-based media content distribution platform 308. The media content distribution platforms shown in FIG. 3 are illustrative only. Other media content distribution platforms, including other combinations of distinct media content distribution platforms may be employed by delivery subsystem 202 in other embodiments.

The distinct media content distribution platforms may be utilized to deliver distinct types of media content to one or more access devices 210. In some examples, distinct types of media content may be delivered via distinct media content delivery channels, services, and access devices. Distinct types of media content may include media content of distinct media formats and/or media content delivered using distinct media formats, channels, services, and/or protocols, for example. Examples of distinct types of media content may include, without limitation, on-demand media content, pay-per-view media content, broadcast or multicast television media content, and Internet-based media content. Other examples of distinct types of media content may include, without limitation, video media content, audio media content, still-image media content, and interactive media content.

Access devices 210 may include any computing devices configured to perform one or more of the access device operations disclosed herein, including receiving media content from delivery subsystem 202 and processing the media content for presentation to user 212. Examples of an access device 210 may include, but are not limited to, a set-top box device, a digital video recorder ("DVR") device, a wireless computing device, a personal computer, a mobile phone device, a portable computing device (e.g., a laptop computer), a personal digital assistant, a vehicular computing device, a personal media player device, and/or any other media content access device configured to perform one or more of the access device operations described herein. As shown in the exemplary implementation 300 of FIG. 3, in certain embodiments, access subsystem 206 may include a set-top-box device 310, a mobile phone device 312, and a personal computer device 314 (e.g., a desktop or laptop computer) associated with user 212.

Exemplary components and configurations of watch list subsystem 204 and access device 210 will now be described in reference to FIGS. 4-5. The exemplary components and configurations are illustrative only. Alternative components and configurations may be used in other embodiments. For example, while the examples shown in FIGS. 4-5 are directed to a client-server type implementation of watch list components and processes, in other examples one or more watch list components and/or processes may be moved from client-side to server-side for more of a service-oriented implementation.

Figure 4:
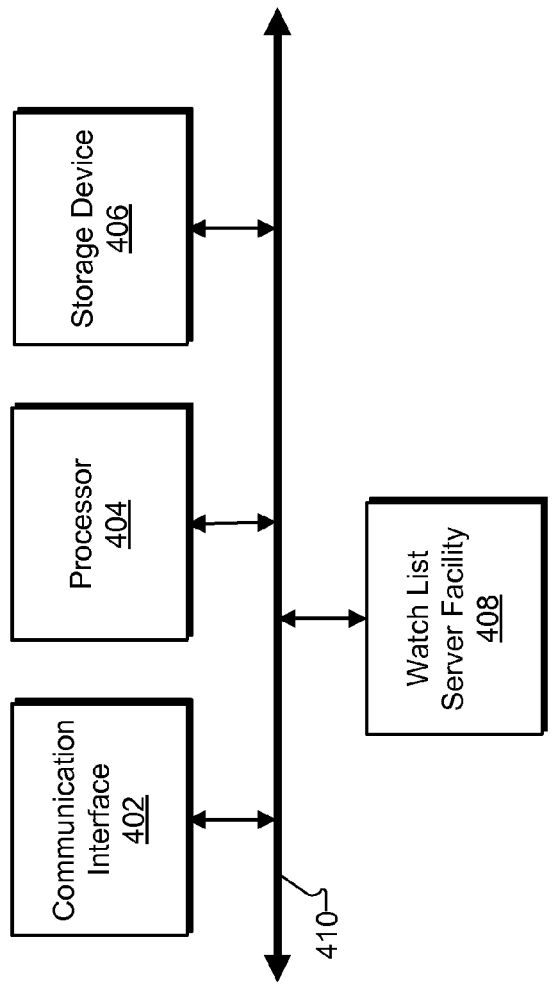
FIG. 4 illustrates exemplary components of a media content watch list subsystem.
Figure 5:
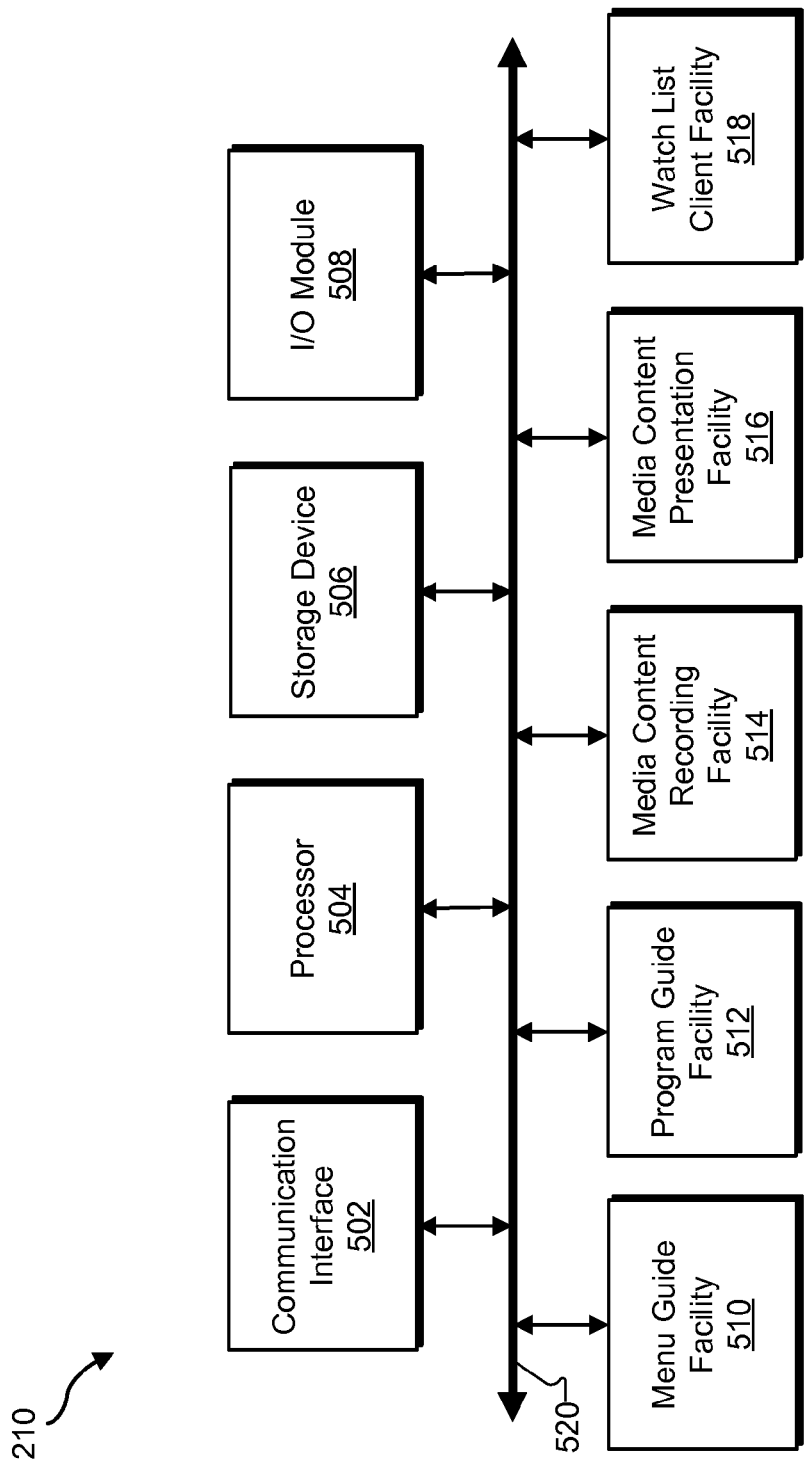
FIG. 5 illustrates exemplary components of a media content access device.

FIG. 4 illustrates exemplary components of watch list subsystem 204, which may be implemented on one or more computing devices such as one or more server devices. As shown in FIG. 4, watch list subsystem 204 may include a communication interface 402, processor 404, storage device 406, and watch list server facility 408 communicatively coupled to one another via a communication infrastructure 410. The components of watch list subsystem 204 may communicate with one another, including sending data to and receiving data from one another via communication infrastructure 410, using any suitable communication technologies. Components of watch list subsystem 204 shown in FIG. 4 will now be described in additional detail.

Communication interface 402 may be configured to facilitate communication between watch list subsystem 204 and delivery subsystem 202 and/or one or more access devices 210 of access subsystem 206. In particular, communication interface 402 may be configured to transmit and/or receive communication signals and/or data (e.g., media content watch list data and requests for media content watch lists) to/from access devices 210. Examples of communication interface 402 may include, without limitation, a wired network interface (such as a network interface card), a wireless network interface (such as a wireless network interface card), a modem, and any other suitable interface. In at least one embodiment, communication interface 402 may provide a direct connection between watch list subsystem 204 and delivery subsystem 202 and/or one or more access devices 210 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, or any other suitable connection.

Processor 404 may include one or more processors and may be configured to execute and/or direct execution of one or more of the watch list subsystem processes or operations described herein. Processor 404 may direct execution of operations in accordance with computer-executable instructions such as may be stored in storage device 406 or another computer-readable medium. As an example, processor 404 may be configured to process data, including demodulating, decoding, and parsing acquired data (e.g., data representative of media content watch list data received from one or more access devices 210), and encoding and modulating data for transmission by communication interface 402.

Storage device 406 may include one or more data storage media, devices, and/or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, watch list data 108 and/or watch list setup data 110 may be stored in storage device 406. In some examples, data may be arranged in one or more databases residing within storage device 406.

Watch list server facility 408 may be configured to perform and/or direct one or more components of watch list subsystem 204 to perform one or more of the watch list processes and/or operations described herein, including one or more of the processes of watch list maintenance facility 102 and/or watch list generation facility 104. In certain embodiments, watch list server facility 408 may be implemented at least in part as computing instructions (e.g., as one or more software applications) residing within storage device 406 and configured to direct processor 404 to perform and/or direct one or more other components of watch list subsystem 204 to perform one or more of the watch list subsystem processes and/or operations described herein. Such exemplary watch list processes are described further below.

FIG. 5 illustrates exemplary components of a media content access device 210. As shown in FIG. 5, access device 210 may include a communication interface 502, processor 504, storage device 506, input/output ("I/O") module 508, menu guide facility 510, program guide facility 512, media content recording facility 514, media content presentation facility 516, and watch list client facility 518 communicatively coupled to one another via a communication infrastructure 520. The components of access device 210 may communicate with one another, including sending data to and receiving data from one another via communication infrastructure 520, using any suitable communication technologies. In some examples, one or more of the facilities shown in FIG. 5 may be implemented at least in part as computing instructions (e.g., as one or more software applications) residing within storage device 506 and configured to direct processor 504 to perform and/or direct one or more other components of access device 210 to perform one or more of the access device processes and/or operations described herein.

While an exemplary implementation of access device 210 is shown in FIG. 5, the components illustrated in FIG. 5 are not intended to be limiting. Additional or alternative components may be used in other embodiments. Moreover, one or more components illustrated in FIG. 5 may be omitted from access device 210 in other embodiments. Components of the access device 210 shown in FIG. 5 will now be described in additional detail.

Communication interface 502 may be configured to facilitate communication between access device 210 and delivery subsystem 202 and/or watch list subsystem 204. In particular, communication interface 502 may be configured to transmit and/or receive communication signals, media content, and/or data (e.g., program guide content, media content watch list data, etc.) to/from delivery subsystem 202 and/or watch list subsystem 204. Examples of communication interface 502 may include, without limitation, a wired network interface (such as a network interface card), a wireless network interface (such as a wireless network interface card), a modem, and any other suitable interface. In at least one embodiment, communication interface 502 may provide a direct connection between access device 210 and delivery subsystem 202 and/or watch list subsystem 204 via a direct link to a network, such as the Internet. Communication interface 502 may additionally or alternatively provide such a connection through, for example, a local area network (such as an Ethernet network), a personal area network, a telephone or cable network, a cellular telephone connection, a satellite data connection, or any other suitable connection.

As mentioned, delivery subsystem 202 may transmit (e.g., broadcast, multicast, and/or narrowcast) data representative of media content. Communication interface 502 may be configured to receive media content transmissions such that the media content may be processed by access device 210. To this end, communication interface 502 may include any device, logic, and/or other technologies suitable for receiving signals, media content, and/or any other data as may serve a particular application. Communication interface 502 may be configured to interface with any suitable communication media, protocols, and formats, including any of those mentioned above.

In certain embodiments, delivery subsystem 202 may be configured to transmit and access device 210 may be configured to receive media content streams carrying data representative of various media content instances in accordance with a transmission schedule. The transmission schedule may specify that particular media content instances are to be transmitted at scheduled transmission times and on certain media content carrier channels. Such transmissions may be referred to as "live transmissions" of media content. As used herein, the term "scheduled transmission time" or "scheduled transmission" may refer generally to any period of time during which a media content instance is to be transmitted to access device 210. The term "media content carrier channel" or "content channel" as used herein may refer generally to any carrier of media content, including, but not limited to, media (e.g., television) channels, streams, addresses, frequencies or other carriers of media content.

Communication interface 502 may be configured to selectively identify, receive, and/or process appropriate media content streams at the scheduled transmission times and on the appropriate media content carrier channels. For instance, in certain implementations communication interface 502 may include a tuner configured to selectively receive media content carried on a particular media content carrier channel. The tuner may be tuned to a particular media content carrier channel such that the media content carried on the media content carrier channel is received and may be processed by access device 210.

In some examples, communication interface 502 may include multiple tuners such that media content carried on different media content carrier channels may be concurrently received for processing by access device 210. For example, communication interface 502 may include a first tuner configured to receive media content carried on an analog video signal and a second tuner configured to concurrently receive media content carried on a digital compressed signal.

While one or more tuners may be used to receive various types of media content-carrying signals (e.g., media content streams) transmitted by delivery subsystem 202, additionally or alternatively, communication interface 502 may be configured to receive other types of signals (e.g., other types of media content carrying signals) from delivery subsystem 202 and/or one or more other sources without using a tuner. For example, delivery subsystem 202 may transmit media content streams in the form of data packets (e.g., IP-based data packets) that can be received without using a tuner. For such types of signals, communication interface 502 may receive and forward the signals directly to other components of access device 210 without the signals going through a tuner. For an IP-based signal, for example, communication interface 502 may function as an IP receiver.

In certain embodiments, access device 210 may be configured to request and receive pay-per-view and/or on-demand media content instances from delivery subsystem 202. For example, access device 210 may transmit a request for a video-on-demand ("VOD") program to delivery subsystem 202, which may receive the request and transmit a media content stream carrying the VOD program to access device 210. Access device 210 may receive the media content stream and process the VOD program (e.g., present the VOD program for experiencing by a user 108).

The above-described examples of access device 210 receiving media content instances from delivery subsystem 202 are illustrative only. Delivery subsystem 202 may transmit and access device 210 may receive data representative of one or more media content instances in any suitable way and using any suitable technologies.

Communication interface 502 may be configured to transmit and receive media content watch list data to/from watch list subsystem 204. Communication interface 502 may also be configured to transmit requests for media content watch lists to watch list subsystem 204. Examples of access device 210 transmitting media content watch list data to watch list subsystem 204, requesting and receiving media content watch list data from watch list subsystem 204, and processing media content watch list data received from watch list subsystem 204 are described further below.

Processor 504 may include one or more processors and may be configured to execute and/or direct execution of one or more of the access device processes or operations described herein. Processor 504 may direct execution of operations in accordance with computer-executable instructions such as may be stored in storage device 506 or another computer-readable medium. As an example, processor 504 may be configured to process data, including demodulating, decoding, and parsing acquired data (e.g., data representative of media content received from delivery subsystem 202), and encoding and modulating data for transmission by communication interface 502.

Storage device 506 may include one or more data storage media, devices, and/or configurations and may employ any type, form, and combination of data storage media and/or device. For example, storage device 506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 506. For example, watch list data 108 and/or watch list setup data 110 may be stored in storage device 506. In some examples, data may be arranged in one or more databases residing within storage device 506.

I/O module 508 may be configured to receive user input and provide user output and may include any hardware, firmware, middleware, software, or combination thereof supportive of input and output capabilities. For example, I/O module 508 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O module 508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 508 is configured to provide graphical data to a display for presentation to a user 108.

Menu guide facility 510 may be configured to generate and provide graphical data representative of one or more interactive menu views to I/O module 508 for display within one or more graphical user interfaces ("GUIs"). Exemplary menu views are described further below. In addition, menu guide facility 510 may be configured to initiate requests for data to be included in an interactive menu view in a GUI. For example, menu guide facility 510 may detect a user selection of a particular option in a menu guide facility 510 and, in response to the user selection, may initiate a request for data related to the selected option. As described in more detail further below, in some examples, such requested data may include media content watch list data.

Program guide facility 512 may be configured to maintain and operate on electronic program guide data. As mentioned above, media content instances may be transmitted by delivery subsystem 202 at scheduled transmission times and on certain media content carrier channels. To assist access device 210 and/or a user of access device 210 with reception of media content instances at appropriate scheduled transmission times and on appropriate media content carrier channels, program guide data may be received by communication interface 502 from delivery subsystem 202 and/or from another source. The program guide data may be stored in storage device 506.

Program guide facility 512 may be configured to arrange and provide graphical data representative of a program guide view to I/O module 508 for inclusion in a GUI. I/O module 508 may generate and provide a GUI including the program guide view to a display for presentation to a user. A program guide view may include a graphical arrangement of program guide data, one or more program guide tools (e.g., program guide navigation, search, and/or filter tools), one or more graphical selectors for navigating and highlighting selectable options, and/or other graphics. Typically, a program guide view presents at least a portion of a media content transmission schedule to a user 212. The user 212 may utilize the program guide view to access information about media content instances and scheduled transmission times and channels associated with the media content instances.

Media content recording facility 514 may be configured to record data representative of media content instances received from delivery subsystem 202 to storage device 506. The recording of a media content instance is typically performed during a transmission time slot when data representative of the media content instance is received from delivery subsystem 202 as described above. For example, during transmission of a media content instance from delivery subsystem 202 to access device 210 on a media content carrier channel, communication interface 502 may receive data representative of the media content instance on the media content carrier channel, and media content recording facility 514 may direct that the received data representative of the media content instance be stored to storage device 506. Once stored, the data representative the media content instance may be accessed and processed as may suit a particular application, including providing data representative of the media content instance to a display for presentation to a user 212.

Media content presentation facility 516 may be configured to control a presentation of media content to a user 212 of access device 210. For example, media content presentation facility 516 may be configured to generate and provide graphical data representative of one or more media content presentation views to I/O module 508 for display within one or more GUIs. Media content presentation facility 516 may control presentation (e.g., playback) of a media content instance within such a media content presentation view.

Watch list client facility 518 may be configured to perform and/or direct one or more components of access device 210 to perform one or more of the watch list processes and/or operations described herein. For example, watch list client facility 518 may be configured to provide graphical data representative of one or more media content watch list views to I/O module 508 for display within one or more GUIs. In addition, watch list client facility 518 may be configured to provide one or more tools for inclusion in one or more GUIs for use by a user 212 of access device 210. Watch list client facility 518 may be further configured to interpret and process user input received through a media content watch list view displayed in a GUI. In certain examples, watch list client facility 518 may be further configured to facilitate user configuration of watch list settings and/or behavior. As mentioned above, for example, user 212 may be provided with one or more tools configured to facilitate user selection of one or more non-watch-list-specific operations to be used to automatically trigger one or more media content watch list data update operations. Exemplary watch list methods, which methods may be performed by system 100 (e.g., watch list maintenance facility 102 and/or watch list generation facility 104), watch list subsystem 204 (e.g., watch list server facility 408 of watch list subsystem 204), and an access device 210 of access subsystem 206 (e.g., watch list client facility 518 of access device 210) will now be described.

Figure 6:
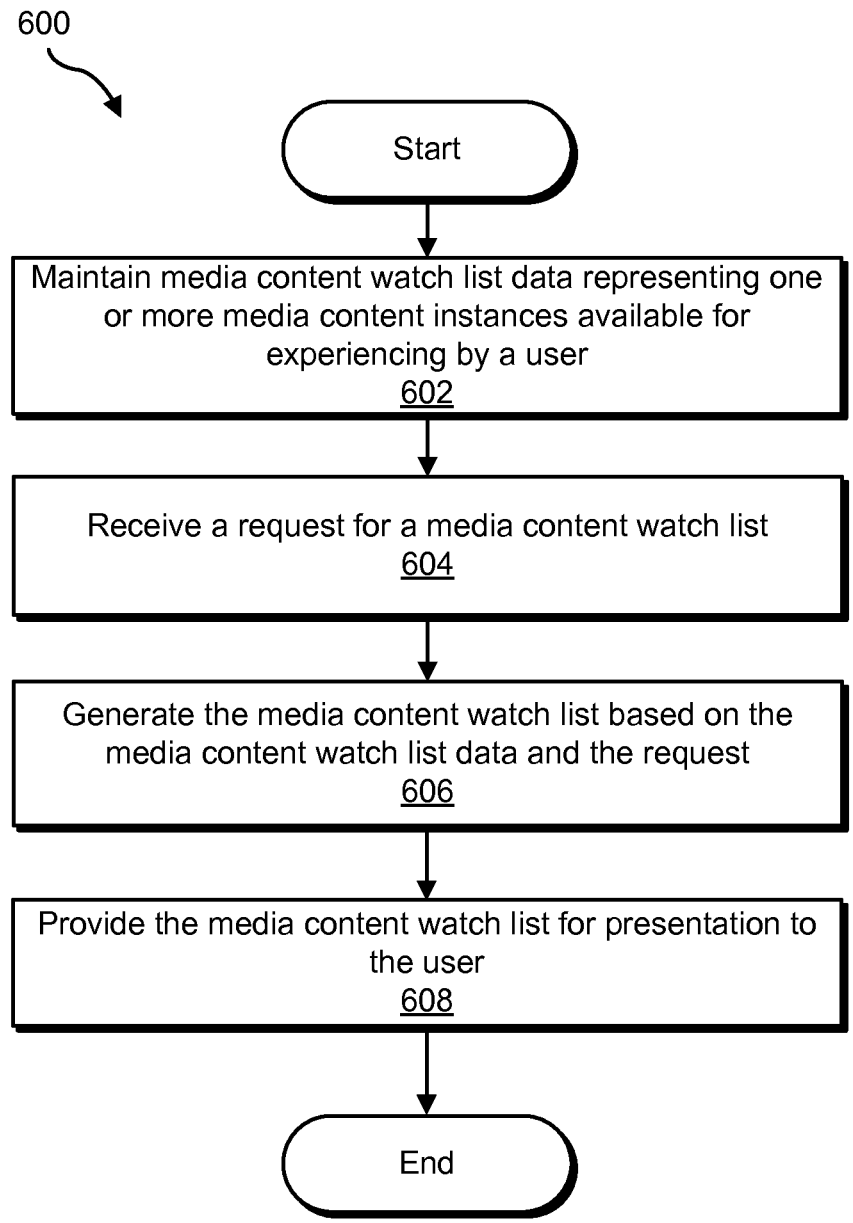
FIG. 6 illustrates an exemplary media content watch list method.

FIG. 6 illustrates an exemplary media content watch list method 600. While FIG. 6 illustrates exemplary steps according to one embodiment, other embodiments may omit, add to, reorder, and/or modify any of the steps shown in FIG. 6.

In step 602, media content watch list data representing one or more media content instances available for experiencing by a user may be maintained. For example, watch list subsystem 204 may maintain media content watch list data representing media content instances that are identified as accessible by one or more access devices 210 associated with user 212. In certain embodiments, step 602 may include watch list subsystem 204 receiving media content watch list data from one or more access devices 210 and aggregating and storing the media content watch list data. In addition, step 602 may include watch list subsystem 204 updating the media content watch list data in any of the ways described herein, including, without limitation, adding data to, deleting data from, and/or modifying data included in the media content watch list data based on one or more predetermined non-watch-list-specific operations and/or one or more predetermined watch-list-specific operations such as receipt of watch-list-specific user input. In certain embodiments, the watch list data may be updated in response to one or more update messages received from one or more access device 210 associated with the user 212.

In step 604, a request for a media content watch list may be received. For example, watch list subsystem 204 may receive a request for a media content watch list from an access device 210 associated with the user 212. In certain embodiments, the access device 210 may generate and transmit the request to watch list subsystem 204 in response to receipt of user input indicating the user's device to view the media content watch list. The request may include one or more parameters that may be used by watch list subsystem 204 to generate the requested watch list.

In step 606, the media content watch list may be generated based on the media content watch list data and the request received in step 604. For example, watch list subsystem 204 may generate the requested media content watch list based on the media content watch list data and one or more parameters included in the request. For instance, watch list subsystem 204 may filter or otherwise select from the media content watch list data certain data based on one or more parameters included in the request. To illustrate, the request may include a user identifier and an access device identifier that may be used by watch list subsystem 204 to identify and select watch list data that is associated with a particular user 212 and/or that is able to be processed by a particular access device 210. In addition, the generation of the watch list may include sorting the data to be included in the watch list such that entries of the watch list may be presented in a particular order as may suit a particular request. In certain examples, generation of the watch list may include multiple iterations of filtering and/or sorting watch list data.

In step 608, the media content watch list may be provided for presentation to the user 212. For example, watch list subsystem 204 may transmit data representative of the generated media content watch list to the requesting access device 210 for presentation to the user 212.

One or more steps of method 600 may be repeated. For example, step 602 may include maintaining media content watch list data by continually receiving and/or updating the media content watch list data in any of the ways described herein. As another example, steps 604-608 may be repeated each time that a media content watch list is requested by an access device 210.

Figure 7:
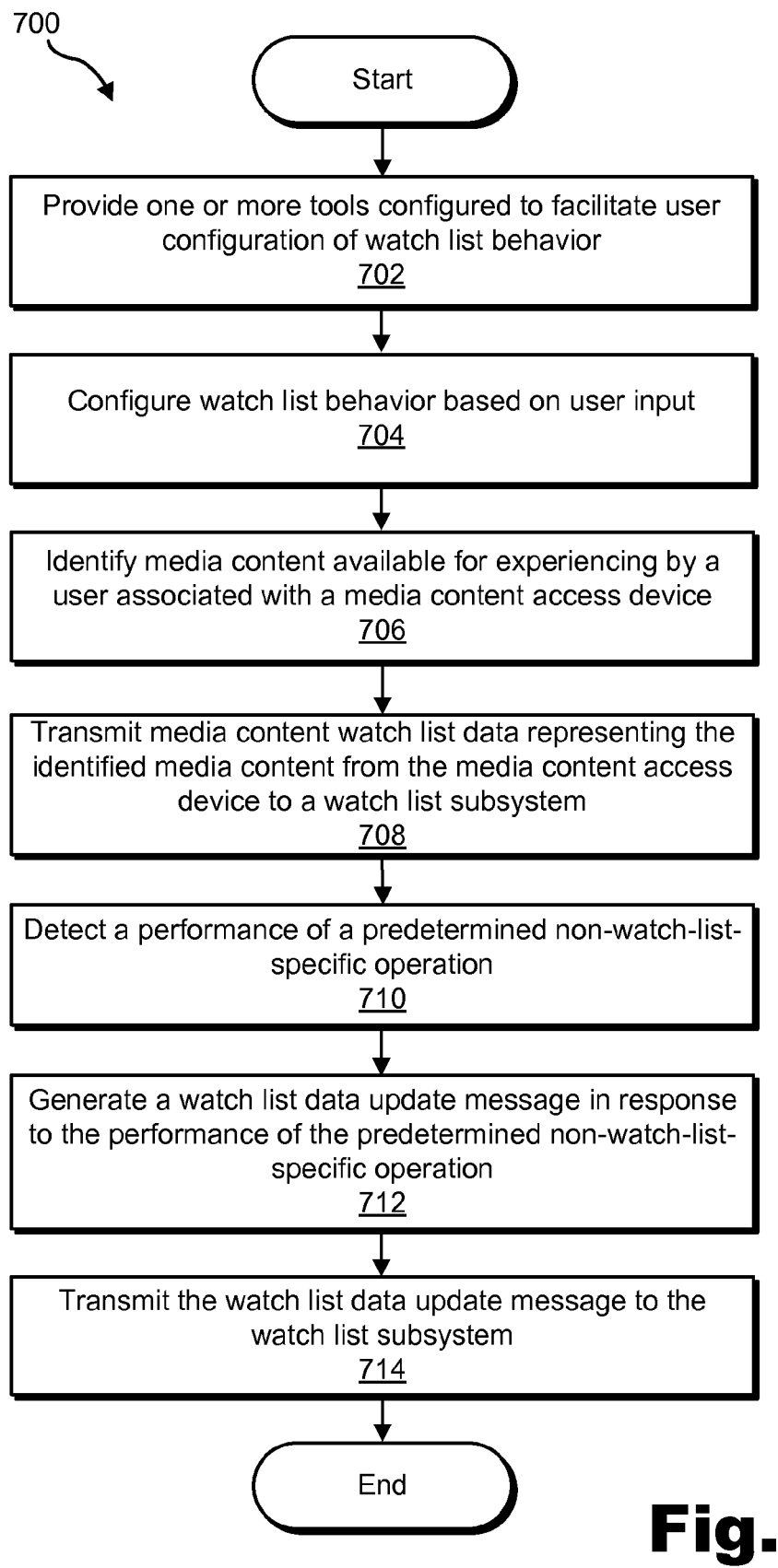
FIG. 7 illustrates another exemplary media content watch list method.

FIG. 7 illustrates another exemplary media content watch list method 700. While FIG. 7 illustrates exemplary steps according to one embodiment, other embodiments may omit, add to, reorder, and/or modify any of the steps shown in FIG. 7.

In step 702, one or more tools configured to facilitate user configuration of watch list behavior are provided. The user 212 may utilize one or more such tools to custom define one or more parameters that may be used by watch list maintenance facility 102 and/or watch list generation facility 104 to determine watch list behavior such as how watch list data is maintained (e.g., what operations will trigger automatic updates to watch list data) and/or how a watch list is generated (e.g., how watch list data is filtered and/or sorted for inclusion in a watch list).

Figure 8:
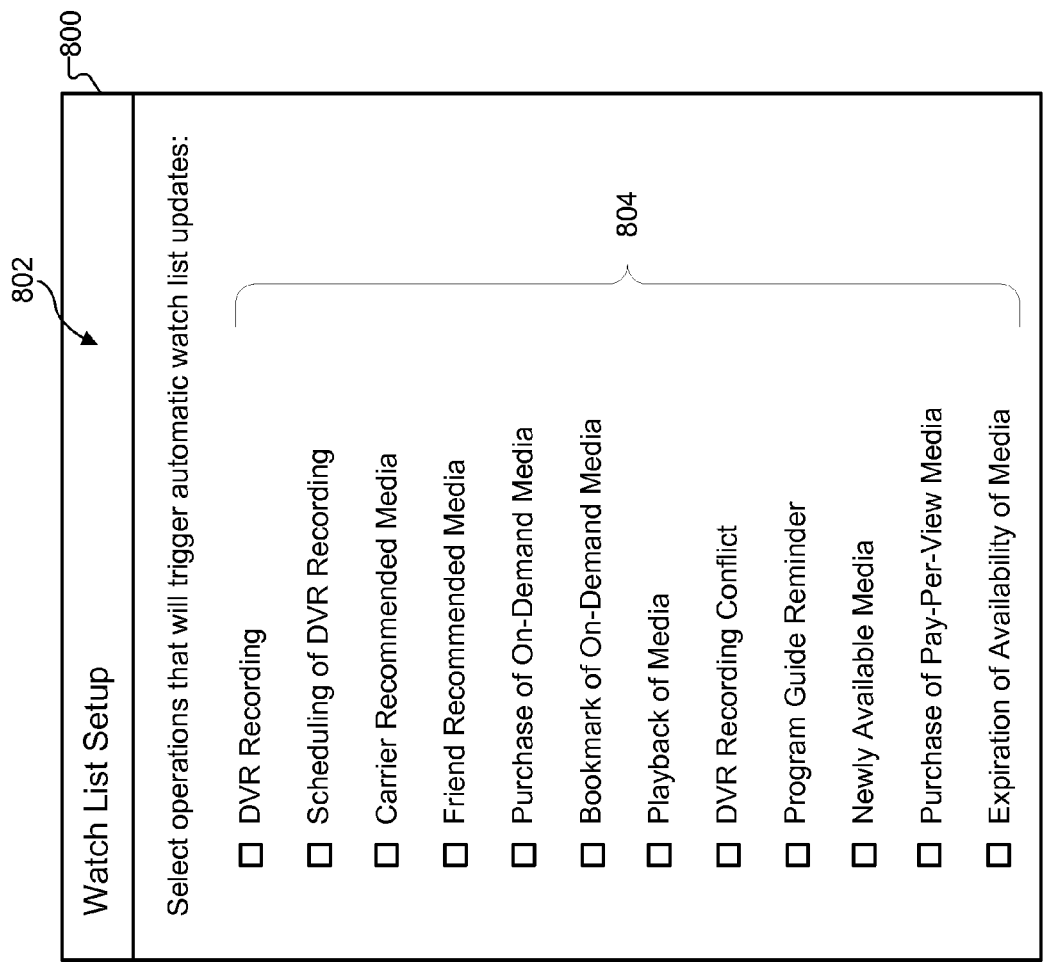
FIG. 8 illustrates a graphical user interface with an exemplary watch list setup view displayed therein.

Such user configuration tools may be provided in one or more GUIs that may be displayed to user 212. As an example, FIG. 8 illustrates a GUI 800 with an exemplary watch list setup view 802 displayed therein. As shown in FIG. 8, GUI 800 may include a plurality of selectable options 804 associated with a plurality of non-watch-list-specific operations. Any of the options 804 may be selected by the user 212 to define a corresponding non-watch-list-specific operation as a predetermined non-watch-list-specific operation that will function as a trigger for one or more operations that may be performed to update media content watch list data. In the illustrated example, the set of options 804 includes options associated with operations such as a DVR recording of media content, a scheduling of a DVR recording of media content, a carrier recommendation of media content, a friend recommendation of media content, a purchase of on-demand media content, a bookmarking of on-demand media content, a playback of media content, a DVR recording conflict, a program guide reminder, media content becoming newly available, a purchase of pay-per-view media content, and an expiration of availability of media content. These examples of non-watch-list-specific operations are illustrative only. Other selectable non-watch-list-specific operations may be included in options 804 in other embodiments.

The user 212 of access device 210 may utilize one or more of the tools included in GUI 800 to select a custom set of non-watch-list-specific operations to be used as predetermined non-watch-list-specific operations that will trigger one or more updates to the media content watch list data maintained by watch list subsystem 204. For example, when the user 212 selects the DVR recording option shown in FIG. 8, watch list maintenance facility 102 may be configured such that a recording of media content will automatically trigger one or more update operations to be performed to update media content watch list data maintained by watch list subsystem 204. For instance, when a media content instance is recorded by access device 210, watch list client facility 518 of access device 210 may detect the recording of the media content instance, recognize the recording as a non-watch-list-specific trigger operation, and generate and initiate transmission of an update message from access device 210 to watch list subsystem 204. The update message may be configured to direct watch list subsystem 204 to perform one or more updates to media content watch list data, such as adding data representative of the recorded media content instance to the media content watch list data maintained by watch list subsystem 204. In this or similar manner, watch list maintenance facility 102 may be configured by the user 212 to monitor and detect performance of one or more user-selected non-watch-list-specific operations performed by access device 210 and to initiate one or more updates to the media content watch list data maintained by watch list subsystem 204 in response to the detected performance of the non-watch-list-specific operations.

In addition to the user 212 selecting a custom set of non-watch-list-specific operations to function as watch list trigger operations, the user 212 may be allowed to select one or more specific updates to be performed in response to any of the non-watch-list-specific operations. For example, when the user 212 selects the playback of media option in GUI 800, watch list maintenance facility 102 may provide one or more additional tools configured to facilitate the user 212 selecting one or more specific updates to be performed in response to a playback of media content. For instance, the user 212 may select that in response to a playback of a media content instance, data representative of the played back media content instance is to be automatically deleted from media content watch list data maintained by watch list subsystem 204. Alternatively, the user 212 may indicate that the user 212 is to be prompted by watch list maintenance facility 102 to manually choose whether to keep or delete the played back media content instance from the media content watch list data. In other embodiments and/or for certain non-watch-list-specific operations, one or more updates to be performed in response to the performance of the non-watch-list-specific operations may be predefined as default updates and unchangeable by the user 212.

Figure 9:
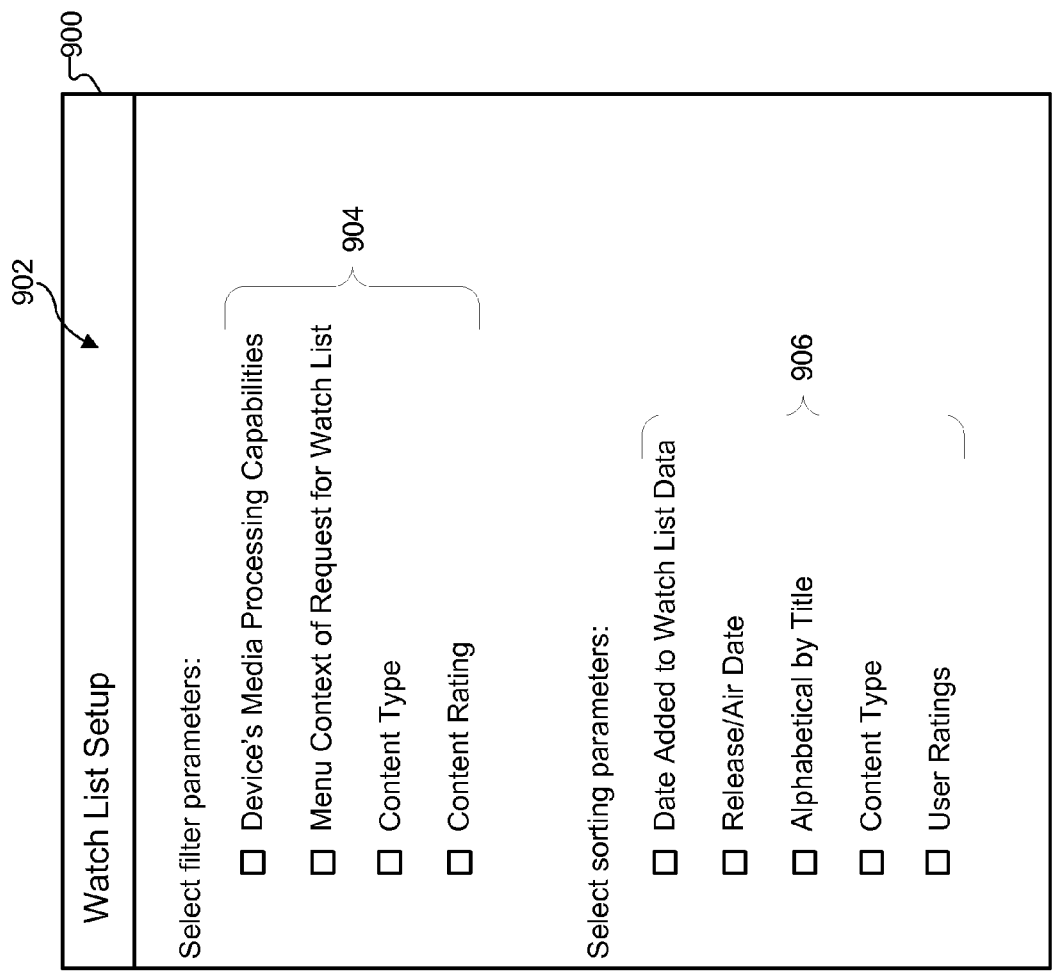
FIG. 9 illustrates a graphical user interface with another exemplary watch list setup view displayed therein.

As another example of user configuration tools, FIG. 9 illustrates a GUI 900 with another exemplary watch list setup view 902 displayed therein. As shown in FIG. 9, GUI 900 may include a plurality of selectable options 904 associated with a plurality of filtering parameters that may be selected by the user 212 for use by watch list generation facility 104 in generating one or more watch lists from watch list data. Any of the options 904 may be selected by the user 212 to define one or more filter parameters to be used to filter watch list data to generate a watch list. In the illustrated example, the set of options 904 includes options associated with filtering watch list data based on media processing capabilities of an access device 210, menu context within which a request for a watch list is received, media content type, and media content rating. The set of options 904 shown in FIG. 9 is illustrative only. Other options and/or sets of options for setting filter parameters may be provided in other embodiments.

As shown in FIG. 9, GUI 900 may also include a plurality of selectable options 906 associated with a plurality of sorting parameters that may be selected by the user 212 for use by watch list generation facility 104 in generating one or more watch lists from watch list data. Any of the options 906 may be selected by the user 212 to define one or more sorting parameters to be used to sort watch list data to generate a watch list (e.g., to order data within the watch list). In the illustrated example, the set of options 906 includes options associated with sorting watch list data based on dates media content was added to the watch list data, release/air dates of media content, alphabetical order of media content titles, media content types, and user ratings of media content. The set of options 906 shown in FIG. 9 is illustrative only. Other options and/or sets of options for selecting sorting parameters may be provided in other embodiments. For examples, other embodiments may include options for sorting based on content duration, expiration, genre, download status, availability status, and any other content attribute(s).

These examples of user-selectable filter parameters and sorting parameters shown in FIG. 9 are illustrative only. Other selectable filter and/or sorting parameters may be included in options 904 or 906 in other embodiments.

One or more of the parameters selected by the user 212 in watch list setup view 902 may be defined to be used by watch list generation facility 104 to filter watch list data to generate a media content watch list. In certain embodiments, the parameters selected during user-setup of watch list behavior may be utilized as initial filter and/or sorting parameters, but may be subject to being overridden, changed, or added to for additional filtering and/or sorting operations, including additional filtering and/or sorting operations that may be performed in response to user input received while a watch list view is displayed to the user 212. Accordingly, the user 212 may be provided with ultimate control to dynamically filter or sort, and re-filter and re-sort, watch list data.

Returning now to FIG. 7, in step 704, watch list behavior may be configured based on user input. For example, behavior of watch list maintenance facility 102 and/or watch list generation facility 104 may be configured by watch list maintenance facility 102 in response to user input received in step 702. For instance, watch list maintenance facility 102 may be configured to automatically perform one or more updates to watch list data 108 based on performance of one or more non-watch-list-specific operations and/or watch-list-specific operations that have been determined based on user input in step 702. The configuration may be accomplished in any suitable way, such as by defining one or more parameters of a watch list maintenance or generation heuristic.

In step 706, media content that is available for experiencing by a user 212 of an access device 210 may be identified. The media content may be identified in any suitable way. For example, watch list client facility 518 may interact with one or more components of access device 210 to identify media content that is accessible by and/or available for playback by access device 210. As an example, watch list client facility 518 may identify one or more media content instances stored in storage device 506 of access device 210. As another example, watch list client facility 518 may interact with media content recording facility 514 to identify one or more media content instances recorded by media content recording facility 514. As yet another example, watch list client facility 518 may interact with program guide facility 512 to identify one or more media content instances scheduled to be transmitted (e.g., broadcast or multicast) to access device 210. Watch list client facility 518 may similarly interact with other components of access device 210 and/or with delivery subsystem 202 to identify media content that is available for experiencing by a user 212 of a media content access device 210.

In step 708, media content watch list data representing the identified media content is transmitted from the media content access device 210 to watch list subsystem 204 may be initiated. For example, watch list client facility 518 may generate media content watch list data representing the media content identified in step 706. Watch list client facility 518 may then initiate transmission of the media content watch list data from media content access device 210 to watch list subsystem 204.

In step 710, a performance of a predetermined non-watch-list-specific operation is detected. The predetermined non-watch-list-specific operation may be detected in any suitable way. For example, watch list client facility 518 of access device 210 may be configured to interact with one or more components of access device 210 to detect a performance of the predetermined non-watch-list-specific operation. For instance, watch list client facility 518 may interact with media content recording facility 514 to detect performance of a predetermined non-watch-list-specific operation such as a recording of a media content instance.

In step 712, a watch list data update message is generated in response to the detected performance of the predetermined non-watch-list-specific operation. For example, watch list client facility 518 may generate the watch list update message, which may include any data configured to direct an updating of watch list data based on the performance of the predetermined non-watch-list-specific operation. For example, the watch list data update message may include any data configured to direct watch list subsystem 204 to update the media content watch list data maintained by watch list subsystem 204 in response to and based on the performance of the predetermined non-watch-list-specific operation detected in step 710.

In step 714, the watch list data update message is transmitted from access device 210 to watch list subsystem 204. For example, watch list client facility 518 may initiate a transmission of the watch list data update message to watch list subsystem 204, which may update watch list data maintained by watch list subsystem 204 in accordance with the watch list data update message.

One or more of the steps of method 700 may be repeated for any subsequent performance of a predetermined non-watch-list-specific operation. For example, steps 710-714 may be performed each time a performance of a predetermined non-watch-list-specific operation occurs. Accordingly, the media content watch list data maintained by watch list subsystem 204 may be continually updated based on the performance of one or more predetermined non-watch-list-specific operations by access device 210.

While method 700 is directed to updating of media content watch list data based on performance of predetermined non-watch-list-specific operations, the method may be modified or expanded to include updating of the media content watch list data based on one or more watch-list-specific operations. For example, watch list client facility 518 may be configured to facilitate manual updates of media content watch list data by the user 212. For instance, the user 212 may provide watch-list-specific user input via a media content watch list view displayed in a GUI. Watch list client facility 518 may be configured to detect such watch-list-specific user input, generate a watch list data update message in response to the watch-list-specific user input, and initiate transmission of the watch list data update message to watch list subsystem 204. The watch-list-specific operations and corresponding updates may include any of the examples of watch-list-specific operations (e.g., watch-list-specific user input) and updates described herein.

In the above-described or similar manner, access device 210 may provide up-to-date media content watch list data to watch list subsystem 204, which may aggregate the media content watch list data with media content watch list data received from other access devices 210. Accordingly, watch list subsystem 204 may be configured to provide a media content watch list that includes media content watch list data acquired from multiple access devices 210 associated with a user 212 and representing media content that is available to the user 212 by way of any of the multiple access devices 210. Accordingly, the user 212 may utilize any of the multiple access devices 210 to access and view a media content watch list.

Figure 10:
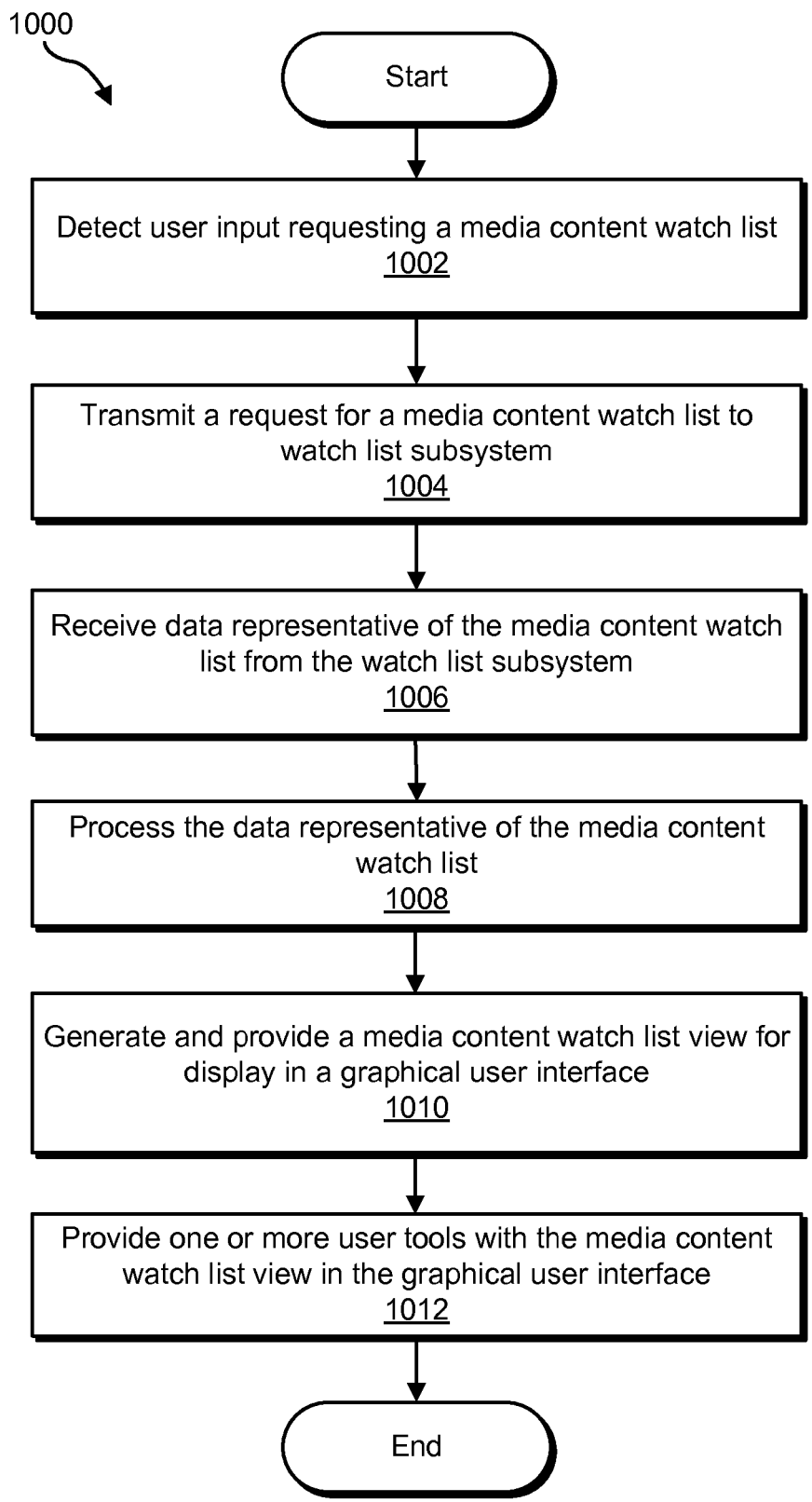
FIG. 10 illustrates another exemplary media content watch list method.

FIG. 10 illustrates another exemplary media content watch list method 700. While FIG. 10 illustrates exemplary steps according to one embodiment, other embodiments may omit, add to, reorder, and/or modify any of the steps shown in FIG. 10.

In step 1002, user input requesting a media content watch list is detected. For example, watch list client facility 518 may detect a receipt of user input requesting a media content watch list by I/O module 408 of access device 210.

In step 1004, a request for a media content watch list is transmitted to watch list subsystem 204. For example, watch list client facility 518 of an access device 210 may generate and initiate transmission of the request for the media content watch list from access device 210 to watch list subsystem 204 in response to the user input detected in step 1002. As described above, the request may include one or more parameters (e.g., a user identifier, an access device identifier, etc.) configured to be used by watch list subsystem 204 to generate the requested watch list from media content watch list data maintained by watch list subsystem 204 based on the request.

In step 1006, data representative of the media content watch list is received from watch list subsystem 204. For example, watch list client facility 518 may receive data representative of the media content watch list from communication interface 402 of access device 210, which received the data representative of the media content watch list from watch list subsystem 204. The media content watch list may be generated and transmitted by watch list subsystem 204 to access device 210 in any of the ways described herein.

In step 1008, the data representative of the media content watch list is processed. For example, watch list client facility 518 may perform one or more operations for processing the data representative of the media content watch list. In certain embodiments, the processing may include one or more local filtering and/or sorting operations, which may be performed in addition to any filtering and/or sorting operations performed by watch list subsystem 204 and may include any of the filtering and/or sorting operations described herein.

In step 1010, a media content watch list view is generated and provided for display in a GUI. The media content watch list view may include data representative of the media content watch list requested in step 1002. The watch list client facility 518 may be configured to generate and provide the media content watch list view to I/O module 408 for display in the GUI. Exemplary media content watch list views are described further below.

In step 1012, one or more user tools are provided together with the media content watch list view in the GUI. For example, watch list client facility 518 may provide one or more user tools to I/O module 408 for inclusion in the GUI. The user tools may be configured to facilitate the user 212 utilizing the media content watch list displayed in GUI. Examples of media content watch list views and one or more user tools that may be provided in media content watch list views will now be described.

Figure 11:
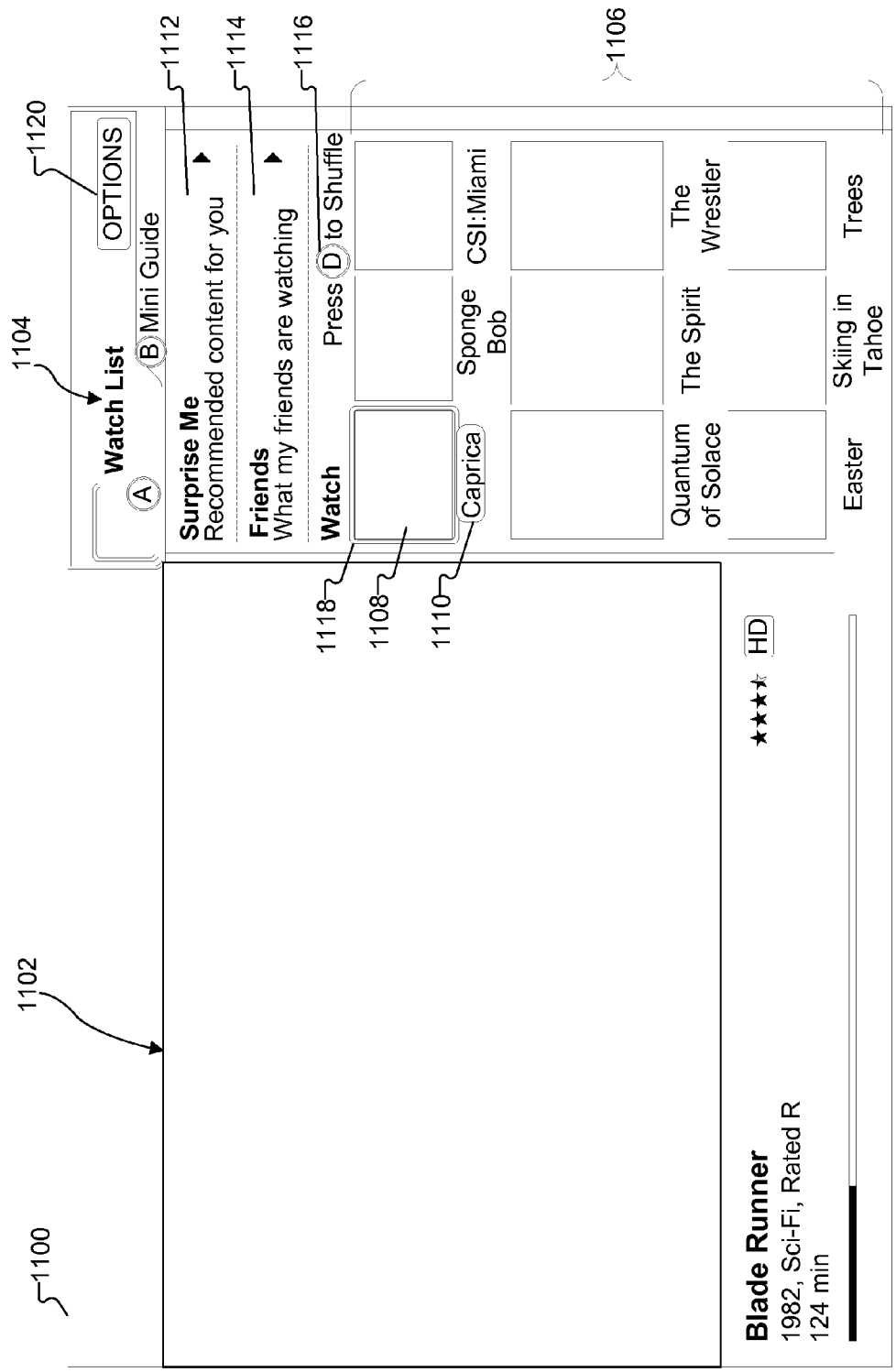
FIGS. 11-18 illustrate graphical user interfaces having exemplary media content watch list views or related views displayed therein.

FIG. 11 illustrates an exemplary GUI 1100 including a video presentation view 1102 and a media content watch list view 1104 displayed therein. As shown, video presentation view 1102 and media content watch list view 1104 may be arranged in a split-screen view within GUI 1100. Video may be presented within video presentation view 1102 for viewing by a user 212 of access device 210.

Media content watch list view 1104 may be displayed in GUI 1100 in response to a user request for a media content watch list. As described above, for example, a user 212 of an access device such as set-top-box device 310 may provide user input requesting a media content watch list. Set-top-box device 310 may generate and transmit a request for the media content watch list to watch list subsystem 204 via network 208. Watch list subsystem 204 may generate a media content watch list based on the watch list data 108 maintained by watch list subsystem 204 and one or more parameters included in the request. This may include filtering and/or sorting watch list data in any of the ways described herein, including, for example, filtering the watch list data such that the generated watch list includes only data representing media content instances of types that are able to be processed and presented by set-top-box device 310, or sorting the watch list data such that the generated watch list includes data representing media content instances ranked by content types and/or by dates the media content instances were added to the watch list data 108. Watch list subsystem 204 may transmit data representative of the generated watch list to set-top-box device 210, which may process and present the watch list in media content watch list view 1104 as illustrated in FIG. 11.

The media content watch list may include data representing one or more media content instances that are available to the user 212 via one or more of the access devices 210 associated with the user 212. As shown in FIG. 11, media content watch list view 1104 may include graphical data 1106 representing one or more media content instances that are included in the media content watch list. In the illustrated example, a thumbnail image and title are displayed for each media content instance represented in the watch list. For example, a thumbnail image 1108 and a title 1110 are displayed for a media content instance titled "Quantum of Solace."

As described above, in certain examples, the media content instances represented in the media content watch list may be of distinct types and may include media content instances that are available for experiencing by the user 212 via set-top-box device 310 as well as media content instances that are available for experiencing by the user 212 via one or more other access devices associated with the user 212. For example, media content watch list view 1104 may display data representing live transmissions of television programs, recorded television programs, movies, on-demand media programs, photographs, and any other types of media content that are available to one or more access devices associated with user 212. In some examples, visual indicators of the types of the media content instances represented in media content watch list view 1104 may be displayed within the media content watch list view 1104. In some examples, media content watch list view 1104 may display data representing media content instances that are accessible by the user 212 via media content access devices of distinct platforms, such as set-top-box device 310, mobile phone device 312, and personal computer device 314.

In certain embodiments, the graphical data 1106 representing one or more media content instances may represent only a portion of the media content instances included in a media content watch list. For example, a watch list may be visually divided in media content watch list view 1104 by category of media content watch list data. For example, media content watch list view 1104 may include sections visually dividing watch list data based on media content type. As another example, media content watch list view 1104 may include sections visually dividing watch list data based on sources of watch list data and/or reasons for inclusion of watch list data in the watch list data 108 maintained by watch list subsystem 204. To illustrate, FIG. 11 shows separate expandable sections 1112 and 1114 within media content watch list view 1104. In the illustrated example, section 1112 is associated with media content recommended by a media content distributor, and section 1114 is associated with media content recommended by one or more friends of the user 212. A friend may recommend media content to the user 212 in any suitable way, such as by using a social networking website or other computing platform configured to be in communication with one or more components of system 200. Additionally or alternatively, media content watch lists may be shared between friends or other users. Accordingly, a friend of the user 212 may be able to view a media content watch list of the user 212 via a social networking website or through another content sharing platform and provide one or more recommendations of media content to the user 212.

Media content watch list view 1104 may provide one or more tools that may be used by the user 212 to interact with a media content watch list. For example, certain "hot input buttons" may be associated with media content watch list view 1104 and selected by the user 212 to initiate performance of one or more predefined actions. For example, the order of graphical data 1106 representing media content instances may be rearranged (e.g., "shuffled") in response to user selection of a predetermined "hot input button" (e.g., a button on a user input remote control device configured to provide input commands to set-top-box device 310), which "hot button" may be visually indicated by display of an indicator 1116 in media content watch list view 1106. Other "hot buttons" may be provided for other actions, including a "hot button" for deleting watch list data from the watch list with a single button actuation.

As another example, the user 212 may navigate within the graphical data 1106 representing media content instances by moving a selector 1118 from one representation of a media content instance to another. The user 212 may select an options button 1120 to access one or more options associated with the media content watch list view 1104, watch list data, and/or a selected media content instance represented in the watch list. The options may include any option for modifying, accessing, or otherwise interacting, utilizing, or managing a media content watch list. Examples of such user interaction options may include, without limitation, options for exposing an unfiltered view of a watch list, adding watch list keywords to be used to find matching media content instances to be added to a watch list, accessing details and/or additional options for a particular media content instance represented in a watch list, initiating playback of a media content instance represented in a watch list, and purchasing, renting, or downloading media content instance represented in a watch list. In some examples, graphical data 806 representing a media content instance may be configured to function as a virtual link from which to begin playback of or otherwise access (e.g., purchase, rent, download) the media content instance.

Figure 12:
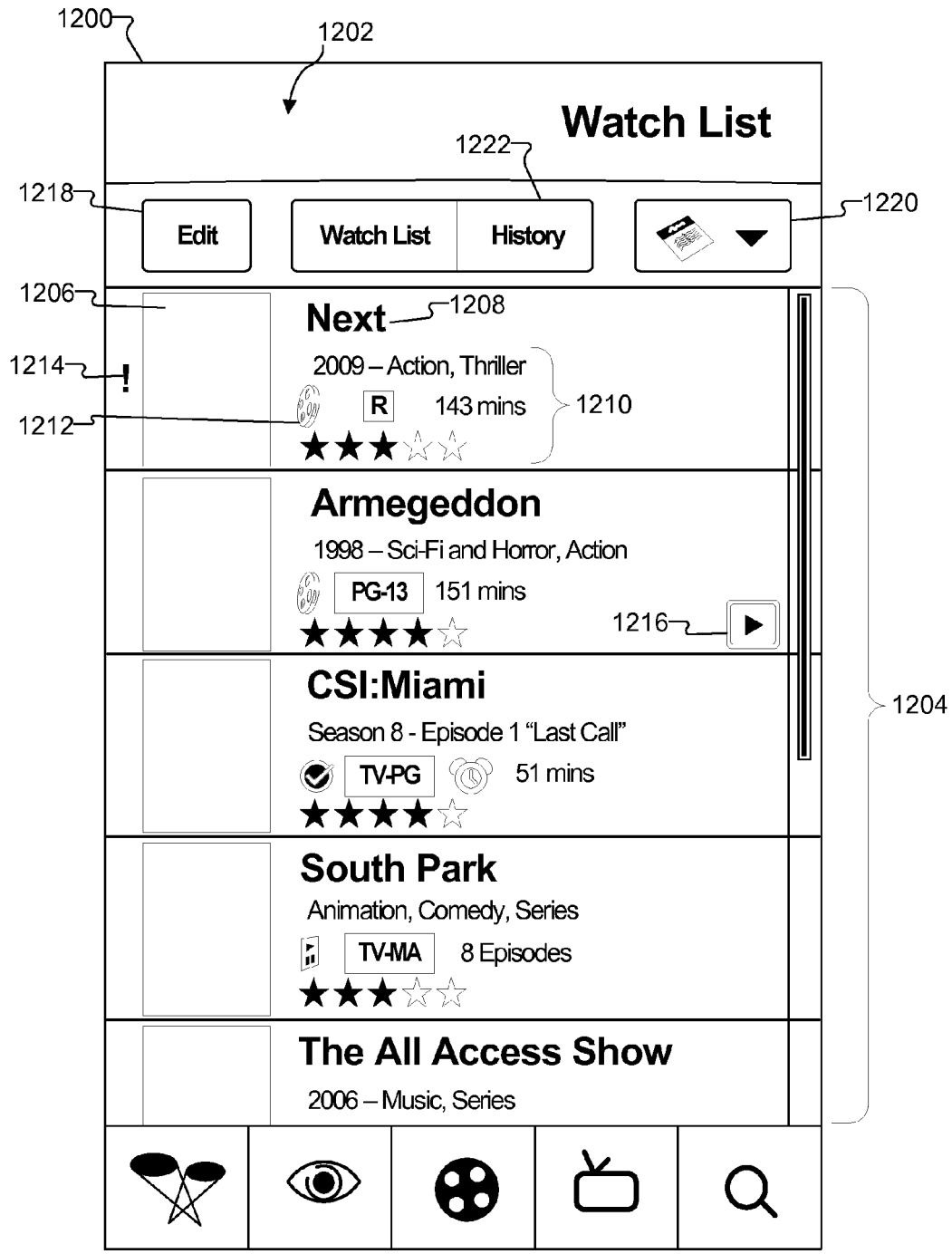

FIG. 12 illustrates a GUI 1200 with another exemplary media content watch list view 1202 (or simply "watch list view 1202") displayed therein. As shown in FIG. 12, media content watch list view 1202 may include graphical data 1204 representing one or more media content instances included in a media content watch list. Graphical data 1204 may indicate information about each of the media content instances included in the media content watch list. For example, for a media content instance titled "Next," graphical data 1204 may include a thumbnail image 1206, a title 1208, and additional information 1210 related to the media content instance. In the illustrated example, additional information 1210 includes information about a release date, genre, rating, runtime, user rating, and content type or distribution platform of the media content instance. A symbol 1212 indicating a content type, distribution platform, or source of the media content instance may be displayed in additional information 1210. Accordingly, each of the media content instances included in the media content watch list view 1202 may include a symbol such as symbol 1212 visually indicating a content type, content distribution platform, or source of content. For examples, media content watch list view 1202 may include symbols indicating content types or sources such as DVR recorded programs, on-demand content store programs, photographs, end-user generated content, and any other types or sources of media content.

Media content watch list view 1202 may also include one or more status indicators representing statuses of media content instances a watch list. In FIG. 12, for example, graphical data 1204 includes a status indicator 1214 associated with the media content instance titled "Next." In the illustrated example, status indicator 1214 represents an "expiring" status of the media content instance, meaning that the media content instance titled "Next" is set to expire at an approaching date after which the media content instance will no longer be available to the user 212. Another status indicator 1216 is displayed in GUI 1200. As shown, status indicator 1216 is associated with a media content instance titled "Armageddon." Status indicator 1216 may indicate a status of the media content instance as being immediately available for playback and experiencing by the user 212. Status indicators 1214 and 1216 are illustrative only. Other status indicators representing other statuses of media content instances included in a watch list may be displayed in media content watch list view 1202.

Figure 13:
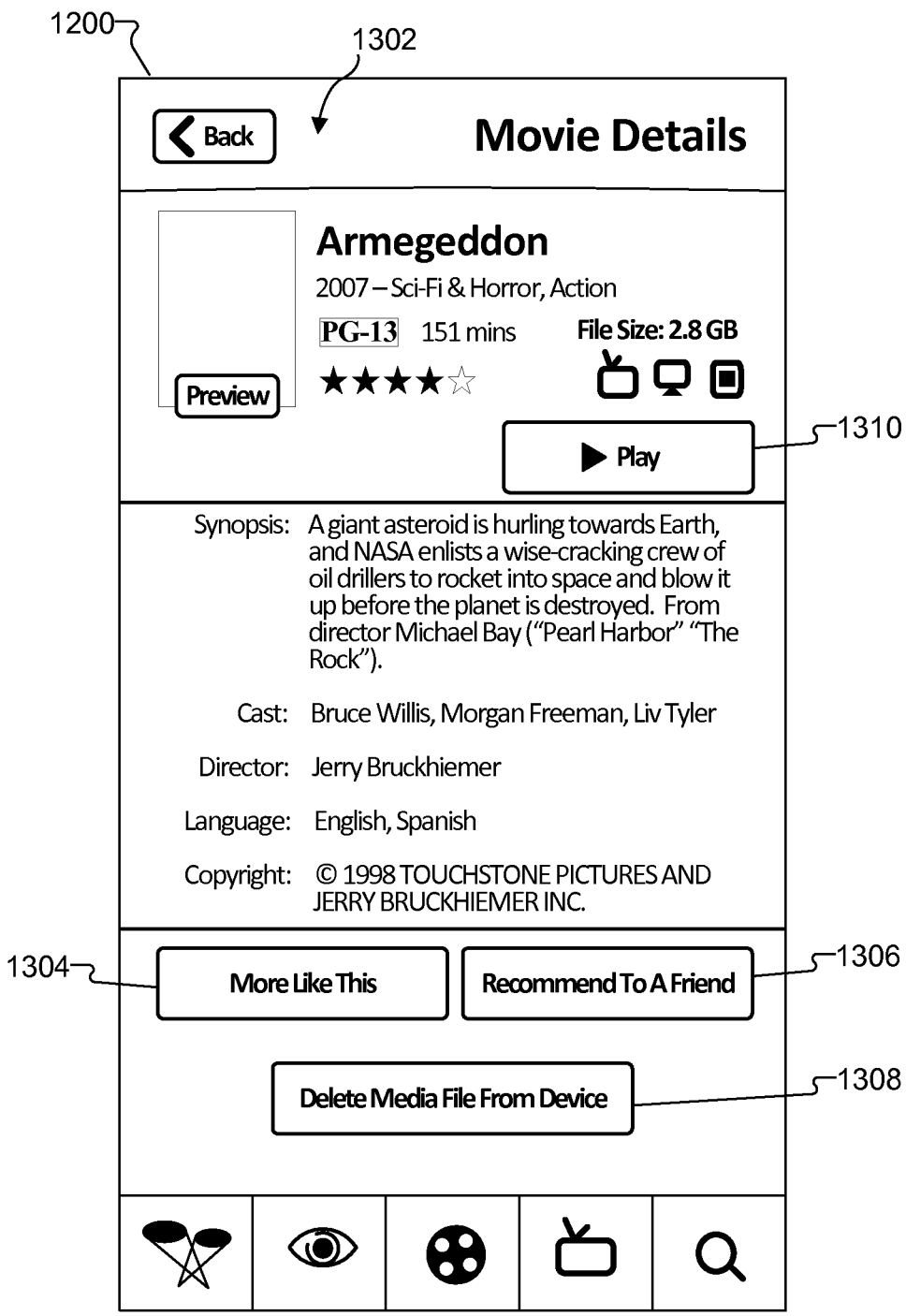

Each graphical representation of a media content instance displayed in media content watch list view 1202 may be configured to function as a virtual link to the media content instance. Accordingly, a user 212 may select a graphical representation of the media content instance displayed in a watch list to access additional detailed information about the media content instance and/or to access a tool to purchase, rent, download, or play back the media content instance. To illustrate, when the user 212 selects a graphical representation of the media content instance titled "Armageddon," detailed information about the media content instance may be displayed in GUI 1200. FIG. 13 shows a media content instance detail view 1302 (or simply "detail view 1302") displayed in GUI 1200. As shown, detailed view 1302 may include additional detailed information about the media content instance including, but not limited to, file size information, a synopsis, cast information, director information, language availability information, and copyright information. Detailed view 1302 may also include one or more selectable options such as an option 1304 to access more media content similar to the selected media content instance, an option 1306 to recommend the media content instance to a friend, an option 1308 to delete the media content instance from access device 210, and an option 1310 to initiate playback of the media content instance. In other examples, detail view 1302 may include one or more options for purchasing, renting, downloading, or otherwise accessing the media content instance.

Figure 14:
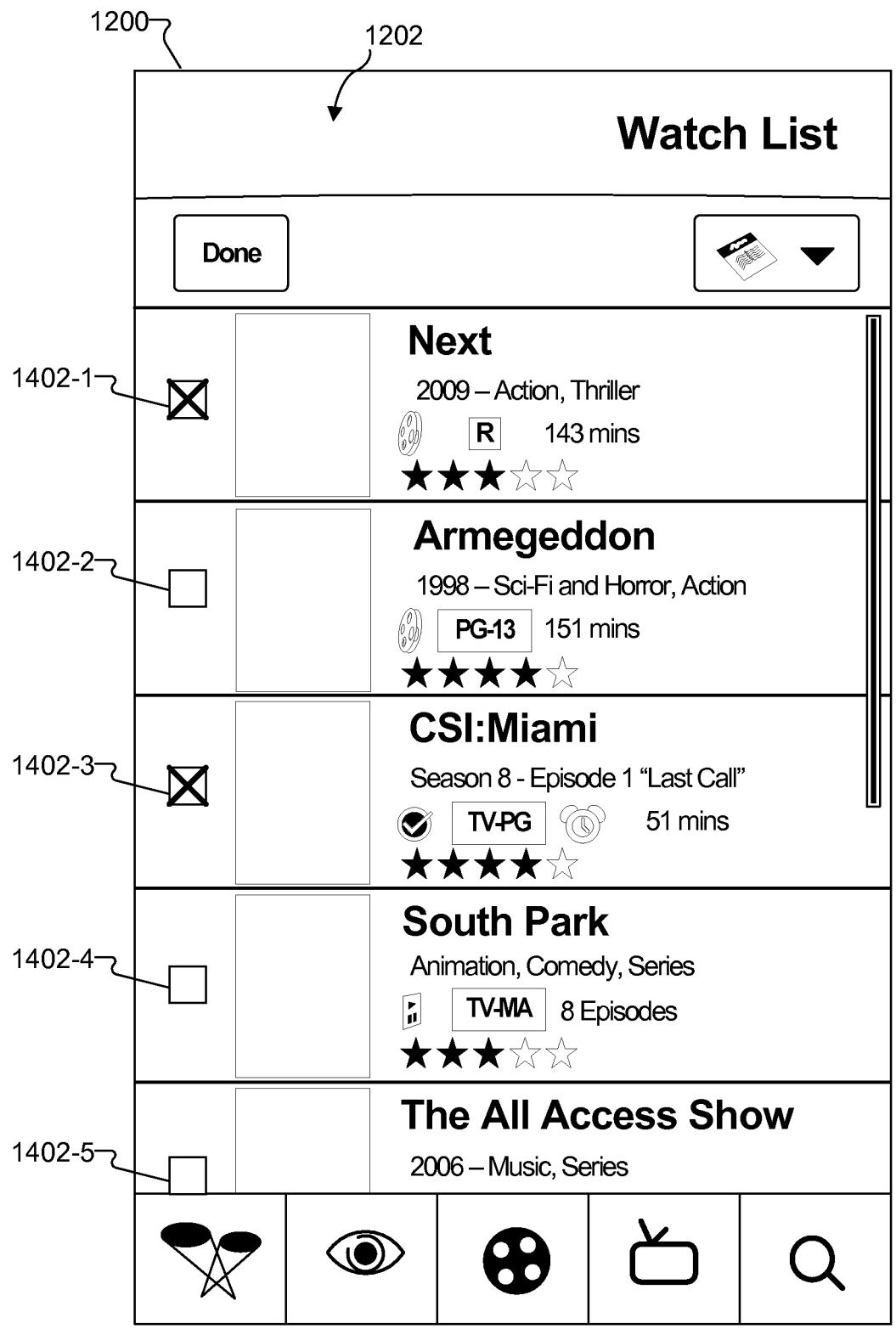

Returning now to FIG. 12, media content watch list view 1202 may include one or more options configured to facilitate user interaction with the watch list displayed in watch list view 1202. Such options may enable the user 212 to manually manage the watch list and/or watch list data associated with the watch list or the user 212. To illustrate, media content watch list view 1202 may include an "edit" option 1218. When the user 212 selects option 1218, one or more tools configured to facilitate user editing of media content watch list data may be presented in GUI 1200. For example, FIG. 14 illustrates exemplary tools 1402 (e.g., edit tools 1402-1 through 1402-5) that may be utilized by the user 212 to edit media content watch list data. In the illustrated example, tools 1402 enable the user 212 to conveniently delete media content watch list data associated with any of the media content instances represented in the watch list displayed in media content watch list view 1202. Edit tools 1402 are illustrative only. Other tools configured to facilitate user editing of media content watch list data within media content watch list view 1202 may be provided.

Figure 15:
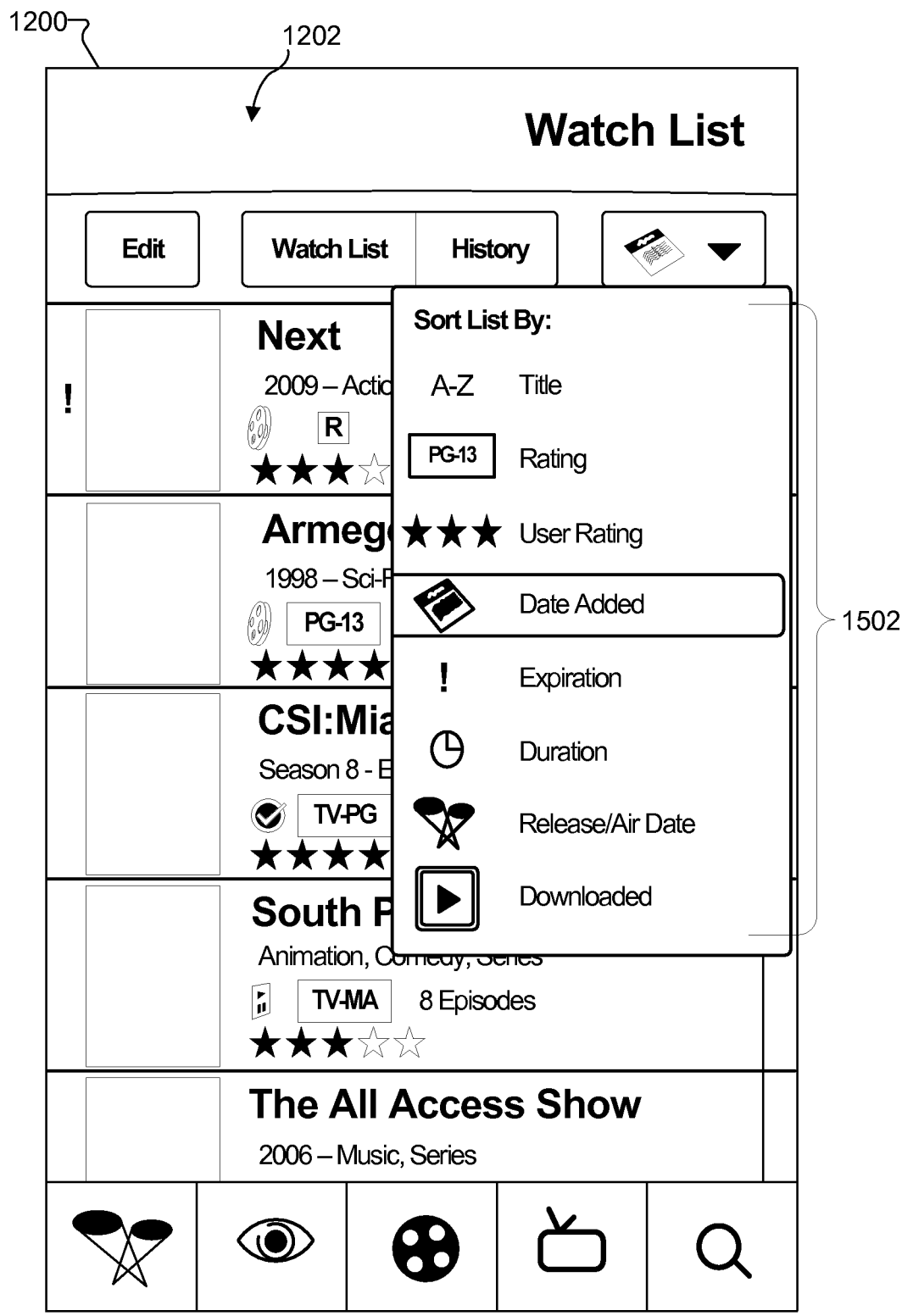

Returning again to FIG. 12, another selectable option 1220 may be selected by the user 212 to access one or more additional options for managing the watch list displayed in media content watch list view 1202. To illustrate, FIG. 15 shows a plurality of selectable options 1502 that may be displayed in GUI 1200 in response to the user 212 selecting option 1220 in media content watch list view 1202. In the example illustrated in FIG. 15, selectable options 1502 include various options for sorting or re-sorting the watch list data displayed in the media content watch list view 1202. The user 212 may select from the list of selectable options 1502 to provide user input requesting that the watch list data be sorted alphabetically by title, rating, user rating, date added to the watch list data, expiration date, duration (e.g., runtime), release/air date, and a particular status (e.g., a "downloaded" status) of media content instances. Accordingly, the user may provide manual input to sort the watch list data as may serve the user's preferences.

Figure 16:
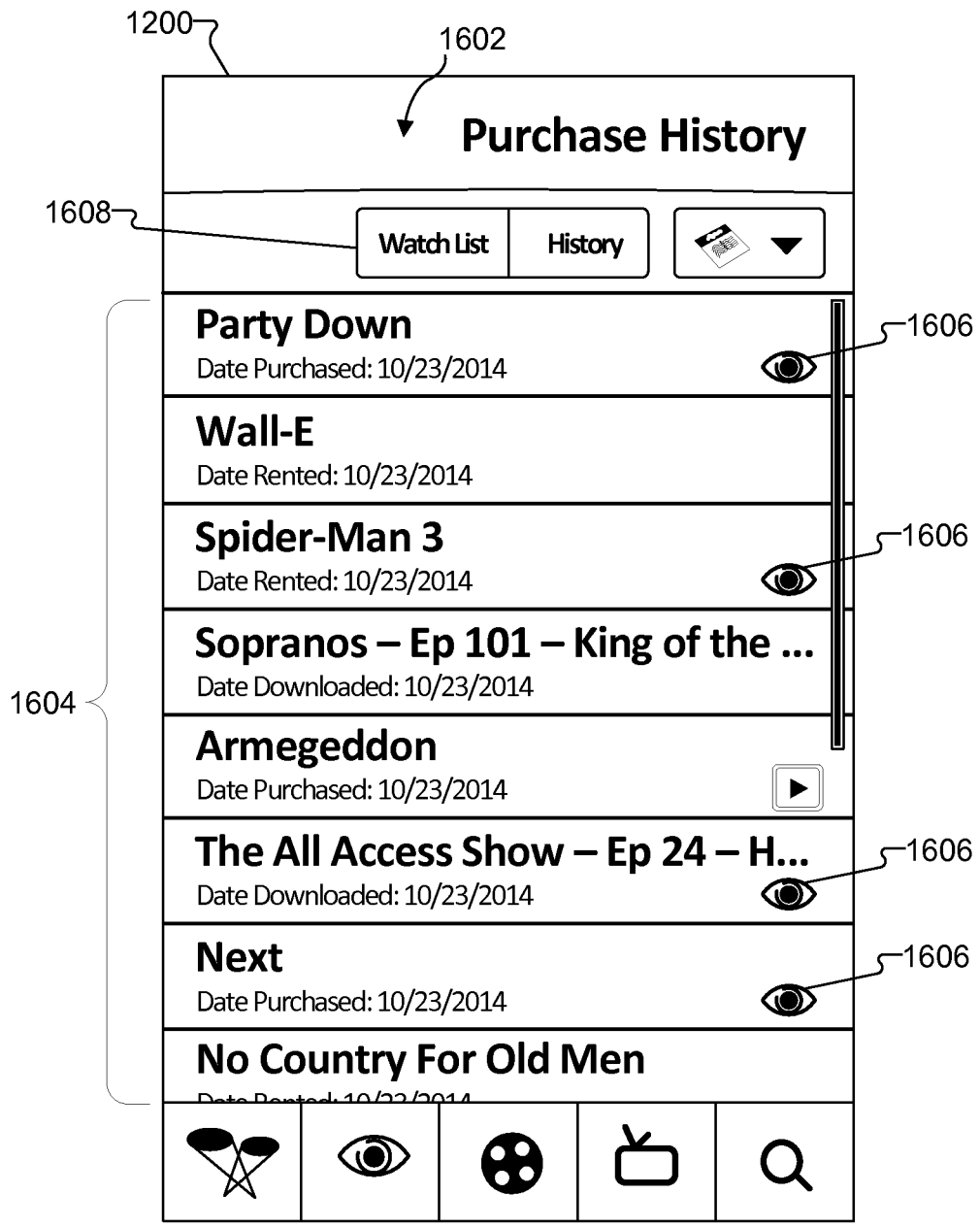

Returning again to FIG. 12, media content watch list view 1202 may also include a history view option 1222 configured to provide the user 212 with access to a history of acquisition of media content instances by one or more access devices 210 associated with the user 212. For example, FIG. 16 illustrates a purchase history view 1602 displayed within GUI 1200. Purchase history view 1602 may include graphical data 1604 representing one or more media content instances purchased, rented, downloaded, or otherwise accessed by the user 212.

One or more of the media content instances represented in purchase history view 1602 may be included in media content watch list data associated with the user 212. In some examples, purchase history view 1602 may include one or more graphical adorners indicating which of the media content instances included in purchase history view 1602 are also included in the media content watch list data associated with the user 212. In the illustrated example, graphical adorners 1606 are displayed indicating that media content instances titled "Party Down," "Spider-Man 3," "The All Access Show," and "Next" are included in watch list data associated with the user 212. The user 212 may conveniently switch from the purchase history view 1602 shown in FIG. 16 back to the media content watch list view 1202 shown in FIG. 12 by selecting a watch list option 1608 displayed in purchase history view 1602.

A graphical adorner, such as the graphical adorner 1606 shown in FIG. 16, may be displayed in one or more other GUI views associated with one or more software applications running on access device 210 to visually depict media content instances that are included in watch list data associated with the user 212. For example, such graphical adorners may be included in menu views, program guide views, DVR recording views, etc.

Figure 17:
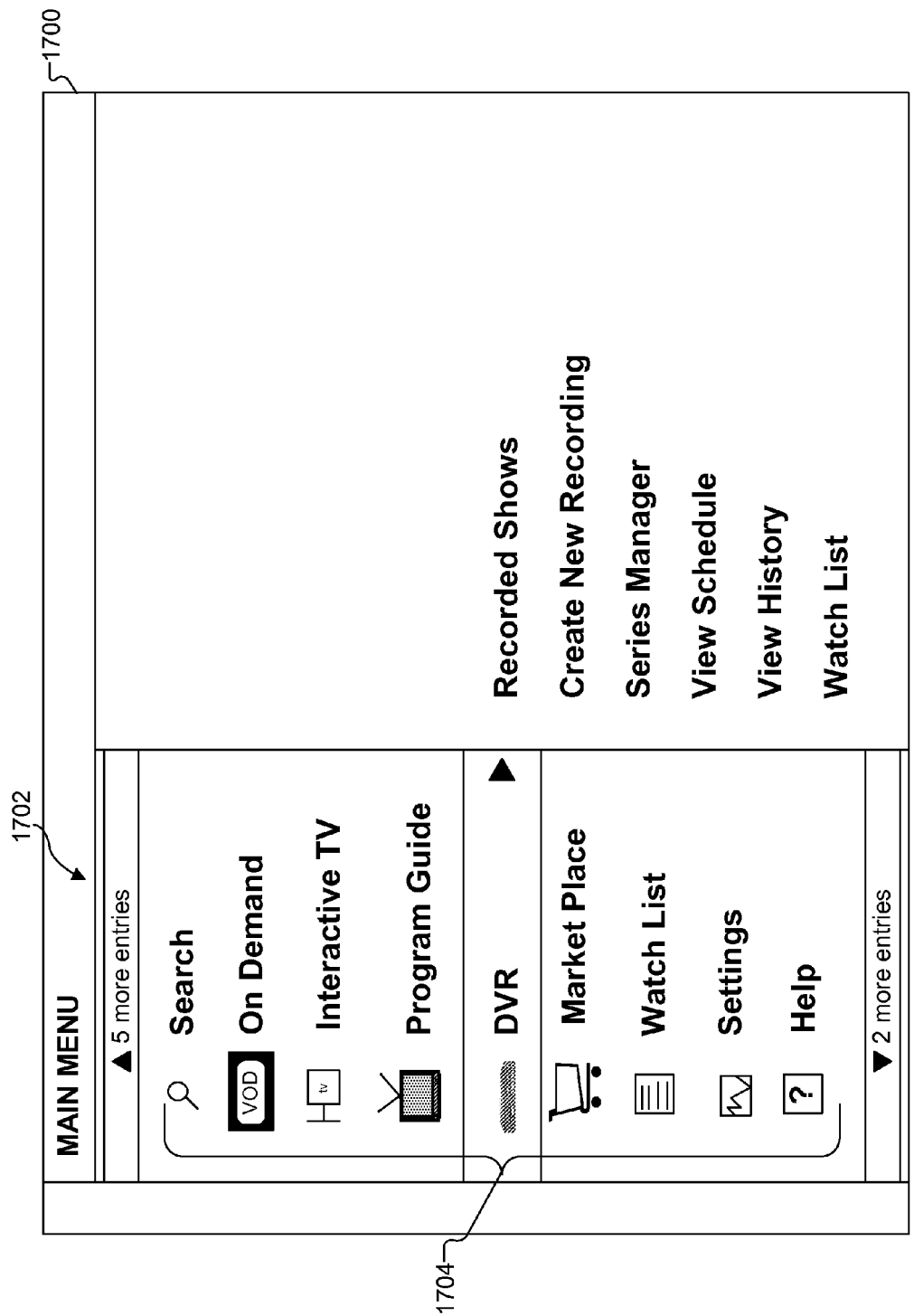
Figure 18:
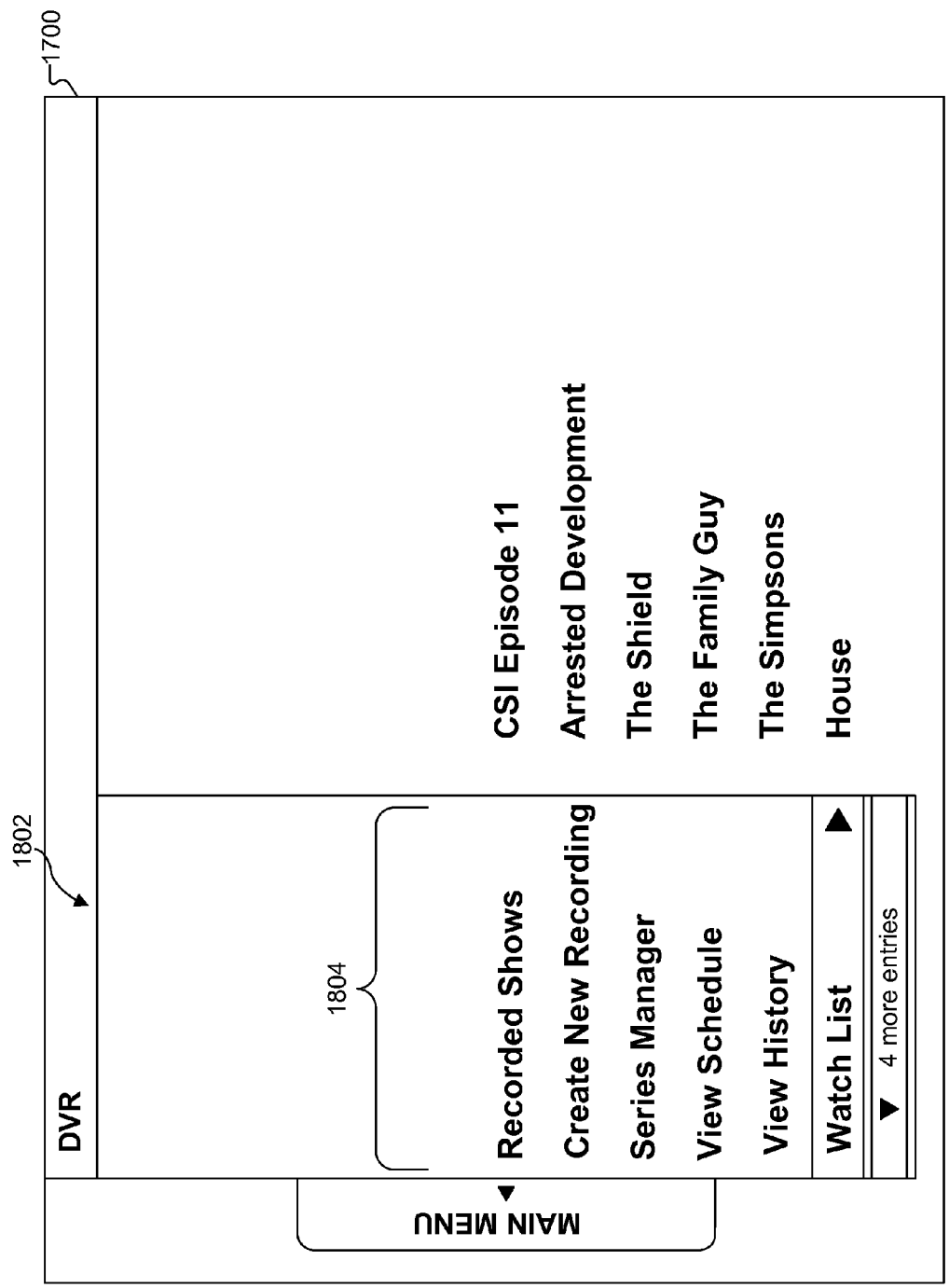

As mentioned, in certain embodiments, media content watch list data may be filtered for presentation based on a menu context within which access to a watch list is requested. To illustrate, FIG. 17 shows an exemplary GUI 1700 having a main menu view 1702 displayed therein. As shown, main menu view 1702 may include a plurality of menu options 1704 that may be selected by the user 212. For example, the user 212 may select a "DVR" menu option to launch a DVR menu view 1802 in GUI 1700 as illustrated in FIG. 18. As shown in FIG. 18, DVR menu view 1802 may include a plurality of DVR options 1804 that may be selected by the user 212. Options 1804 may include a "watch list" option that may be selected by the user 212 to launch a display of a media content watch list view such as media content watch list view 1102 or 1202. The watch list displayed in such a watch list view may be filtered based on the menu context within which the watch list is requested by the user 212. To illustrate, in FIG. 18, the watch list is requested within the context of DVR menu view 1802. Accordingly, the watch list included in the watch list menu view displayed in response to the selection of the watch list option in FIG. 18 may be pre-filtered to include only media content instances associated with a DVR facility running on access device 210 (e.g., DVR recorded media content instances). This example is illustrative only. A watch list view may be launched from one or more other menu views (e.g., a program guide view) and filtered accordingly.

In certain embodiments, media content watch list data may be used as a sync list to help synchronize media content across access devices 210. In other words, media content to be synced across devices may be dictated by a watch list and/or any features of a watch list. For example, each access device 210 may have device-specific preferences and/or capabilities that dictate the types of media content that can be experienced by the user 212 via the access device 210. Media content watch list data may indicate such device-specific preferences and/or capabilities and utilize this information to help synchronize content across access devices 210. To illustrate, when a mobile media content access device (e.g., mobile phone device 312) is tethered or connected to a local wireless network (e.g., Wi-Fi) or to another media content access device (e.g., personal computer device 314), media content watch list data may be utilized to select and synchronize media content across connected media content access devices 210. In certain embodiments, only compatible types of media content (e.g., specific media content formats that can be processed and presented by a media content access device 210) are selected to be synced across connected media content access devices 210.

In certain embodiments, media content watch list data may include time marker data that may be utilized to resume playback of media content from specific stoppage points. For example, when a user 212 terminates playback of a media content instance before playback of the media content instance has completed, a time marker indicating a point at which playback is terminated may be determined and stored in the media content watch list data. When the user 212 provides input indicating that playback of media content instance is to be resumed, the time marker in the media content watch list data may be utilized to resume playback of the media content instance at a point at or near the stoppage point. With a time marker stored in the media content watch list data, playback of the media content instance may be resumed from at or near a stoppage point on any of the access devices 210 associated with the user 212 and that are capable of playing back the media content instance. Accordingly, the user 212 may terminate playback of the media content instance on a particular access device 210 and resume playback of the media content instance beginning at or near the stoppage point on another access device 210.

In certain embodiments, a watch list generated from media content watch list data may be utilized as a media playlist that guides playback of one or more media content instances represented by the watch list. That is, the media content represented in a watch list may be consumable as a playlist of media content. For example, a media content watch list view may include a tool configured to facilitate a playlist-based presentation of the media content represented by a watch list. With the tool, a user 212 may select to initiate playback of the media content represented by the watch list, with the watch list functioning as a playlist to guide playback of the media content. In certain examples, media content instances represented by a watch list may be presented as a continuous playlist stream based on an order in which the media content instances are arranged in the watch list.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a media content watch list subsystem from a media content access device, media content watch list data representing a plurality of media content instances available for experiencing by a user;
maintaining, by the media content watch list subsystem, the media content watch list data;
providing, by the media content watch list subsystem for presentation by the media content access device, a graphical user interface including one or more tools configured to facilitate a user configuration of automatic updates to the media content watch list data in response to performance, by the media content access device, of one or more non-watch-list-specific operations included in a plurality of non-watch-list-specific operations, the one or more tools comprising
a list of non-watch-list-specific operations and a plurality of user selectable options each corresponding to a non-watch-list-specific operation included in the list of non-watch-list-specific operations, and
a list of update operations and a plurality of additional user selectable options each corresponding to an update operation included in the list of update operations;
detecting, by the media content watch list subsystem, a user selection of at least one of the user selectable options corresponding to at least one of the non-watch-list-specific operations included in the list of non-watch-list-specific operations;
configuring, by the media content watch list subsystem in response to the user selection of the at least one of the user selectable options corresponding to the at least one of the non-watch-list-specific operations, the at least one of the non-watch-list-specific operations as at least one predetermined non-watch-list-specific operation configured to trigger automatic updating of the media content watch list data in response to a performance of the at least one predetermined non-watch-list-specific operation by the media content access device;
detecting, by the media content watch list subsystem, a user selection of at least one of the additional user selectable options corresponding to at least one of the update operations included in the list of update operations;
configuring, by the media content watch list subsystem in response to the user selection of the at least one of the additional user selectable options, the at least one of the update operations to be performed in response to the performance of the at least one predetermined non-watch-list-specific operation by the media content access device;
detecting, by the media content watch list subsystem, a performance of the at least one predetermined non-watch-list-specific operation by the media content access device;
automatically updating, by the media content watch list subsystem in response to the detecting of the performance of the at least one predetermined non-watch-list-specific operation by the media content access device, the media content watch list data by performing the at least one of the update operations;
receiving, by the media content watch list subsystem, a request for a media content watch list from the media content access device;

generating, by the media content watch list subsystem, the media content watch list based on the updated media content watch list data and the request; and transmitting, by the media content watch list subsystem, data representative of the media content watch list to the media content access device for presentation to the user.

2. The method of claim 1, wherein:
the media content access device comprises a set-top-box device; and
the at least one predetermined non-watch-list-specific operation comprises at least one of a digital video recorder facility operation, an electronic media program guide facility operation, a media-on-demand facility operation, and a media content presentation facility operation performed by the set-top-box device.

3. The method of claim 1, wherein:
the at least one predetermined non-watch-list-specific operation comprises a detection, by a media content recording facility of the media content access device, of a recording schedule conflict involving two or more media content instances; and
the automatically updating of the media content watch list data comprises adding data representing at least one of the two or more media content instances to the media content watch list data in response to the detection.

4. The method of claim 1, wherein the automatically updating is further based on watch-list-specific user input received by the media content access device, the watch-list-specific user input comprising at least one of:
user input indicating a watch-list-specific keyword configured to be used to search for matching media content instances to be added to the media content watch list data;
user input indicating a request to add data associated with a user-selected media content instance to the media content watch list data;
user input indicating a request to delete data associated with a user-selected media content instance represented in the media content watch list data from the media content watch list data; and
user input indicating a request to change a priority level of a user-selected media content instance represented in the media content watch list data.

5. The method of claim 1, further comprising:
filtering, by the media content watch list subsystem, a subset of the media content watch list data based on at least one of a media processing capability of the media content access device, a media content type, and a menu context within which the request for the media content watch list is initiated.

6. The method of claim 1, wherein the generating of the media content watch list comprises sorting data representing one or more of the media content instances included in the media content watch list based on at least one of a priority level for each of the media content instances, a media content type of each of the media content instances, and a date of addition of data representing each of the media content instances to the media content watch list data.

7. The method of claim 1, wherein the maintaining comprises:
receiving, by the media content watch list subsystem, a portion of the media content watch list data from each of a plurality of media content access devices associated with the user, the plurality of media content access devices including the media content access device; and aggregating, by the media content watch list subsystem, each portion of the media content watch list data received from each media content access device included in the plurality of media content access devices associated with the user to produce the media content watch list data maintained by the media content watch list subsystem.

8. The method of claim 7, wherein:
the plurality of media content access devices comprises media content access devices of distinct media content access platforms; and
the plurality of media content instances represented by the media content watch list data comprises media content instances of distinct media content types.

9. The method of claim 8, wherein the plurality of media content devices associated with the user are configured to access media content via distinct media content distribution platforms.

10. The method of claim 1, wherein the non-watch-list-specific operations included in the list of non-watch-list-specific operations comprise at least one of a media content recording operation, an electronic media program guide operation, a media-on-demand operation, and a media content presentation operation.

11. The method of claim 1, wherein the at least one of the update operations comprises at least one of adding data representative of a media content instance to the media content watch list data, deleting data representative of the media content instance from the media content watch list data, prompting the user to manually indicate whether data representative of the media content instance be kept or deleted from the media content watch list data, and changing a priority level associated with the media content instance in the media content watch list data.

12. The method of claim 1, wherein the non-watch-list-specific operations included in the list of non-watch-list-specific operations comprise a plurality of operations that are performed by one or more facilities included in the media content access device other than a watch list maintenance facility and a watch list generation facility included in the media content access device.

13. The method of claim 1, wherein the non-watch-list-specific operations included in the list of non-watch-list-specific operations comprise a plurality of operations that are performed by the media content access device in response to user input received by way of the media content access device.

14. A method comprising:
receiving, by a media content watch list subsystem, media content watch list data from a plurality of media content access devices, the media content watch list data representing a plurality of media content instances;
aggregating and storing, by the media content watch list subsystem, the media content watch list data received from the plurality of media content access devices;
providing, by the media content watch list subsystem for presentation by a media content access device within the plurality of media content access devices, a graphical user interface including one or more tools configured to facilitate a user configuration of automatic updates to the media content watch list data in response to performance, by the media content access device, of one or more non-watch-list-specific operations included in a plurality of non-watch-list-specific operations, the one or more tools comprising
a list of non-watch-list-specific operations and a plurality of user selectable options each corresponding to a non-watch-list-specific operation included in the list of non-watch-list-specific operations, and a list of update operations and a plurality of additional user selectable options each corresponding to an update operation included in the list of update operations;

detecting, by the media content watch list subsystem, a user selection of at least one of the user selectable options corresponding to at least one of the non-watch-list specific operations included in the list of non-watch-list-specific operations;

configuring, by the media content watch list subsystem in response to the user selection of the at least one of the user selectable options corresponding to the at least one of the non-watch-list-specific operations, the at least one of the non-watch-list-specific operations as at least one predetermined non-watch-list-specific operation configured to trigger automatic updating of the media content watch list data in response to a performance of the at least one predetermined non-watch-list-specific operation by the media content access device;

detecting, by the media content watch list subsystem, a user selection of at least one of the additional user selectable options corresponding to at least one of the update operations included in the list of update operations;

configuring, by the media content watch list subsystem in response to the user selection of the at least one of the additional user selectable options, the at least one of the update operations to be performed in response to the performance of the at least one predetermined non-watch-list-specific operation by the media content access device;

detecting, by the media content watch list subsystem, a performance of the at least one predetermined non-watch-list-specific operation by the media content access device within the plurality of media content access devices; and automatically updating, by the media content watch list subsystem in response to the detected performance of the at least one predetermined non-watch-list-specific operation by the media content access device, the media content watch list data by performing the at least one of the update operations.

15. A method comprising:

transmitting, by a plurality of watch list client facilities within a plurality of media content access devices, media content watch list data to a media content watch list subsystem, the media content watch list data representing a plurality of media content instances accessible by the plurality of media content access devices;

providing, by a watch list client facility within a media content access device included in the plurality of media content access devices, a graphical user interface for presentation by the media content access device, the graphical user interface including one or more tools configured to facilitate a user configuration of automatic updates to media content watch list data maintained by the media content watch list subsystem in response to performance, by the media content access device, of one or more non-watch-list-specific operations included in a plurality of non-watch-list-specific operations, the one or more tools comprising a list of non-watch-list-specific operations and a plurality of user selectable options each corresponding to a non-watch-list-specific operation included in the list of non-watch-list-specific operations, and a list of update operations and a plurality of additional user selectable options each corresponding to an update operation included in the list of update operations;

detecting, by the watch list client facility within the media content access device, a user selection of a user selectable option corresponding to a non-watch-list-specific operation included in the list of non-watch-list-specific operations;

configuring, by the watch list client facility within the media content access device in response to the user selection of the user selectable option corresponding to the non-watch-list-specific operation, the non-watch-list-specific operation to trigger an automatic update to the media content watch list data maintained by the media content watch list subsystem in response to a performance of the non-watch-list-specific operation by the media content access device;

detecting, by the watch list client facility within the media content access device, a user selection of at least one of the additional user selectable options corresponding to at least one of the update operations included in the list of update operations;

configuring, by the watch list client facility within the media content access device in response to the user selection of the at least one of the additional user selectable options, the at least one of the update operations to be performed in response to the performance of the at least one predetermined non-watch-list-specific operation by the media content access device;

detecting, by the watch list client facility within the media content access device, the performance of the non-watch-list-specific operation by the media content access device;

automatically generating, by the watch list client facility within the media content access device in response to the detecting of the performance of the non-watch-list-specific operation by the media content access device, an update to the media content watch list data maintained by the media content watch list subsystem;

initiating, by the watch list client facility within the media content access, another transmission to the media content watch list subsystem, the another transmission including an update message configured to direct the media content watch list subsystem to perform the at least one of the update operations to the media content watch list data maintained by the media content watch list subsystem;

detecting, by the watch list client facility within the media content access device, user input requesting a media content watch list;

transmitting, by the watch list client facility within the media content access device to the media content watch list subsystem, a request for the media content watch list;

receiving, by the watch list client facility within the media content access device, data representative of the media content watch list from the media content watch list subsystem; and generating and providing, by the watch list client facility within the media content access device, a media content watch list view for display in a graphical user interface based on the media content watch list data maintained by the media content watch list subsystem, the media content watch list view including graphical data representing the media content watch list.

16. A system comprising:
a watch list client facility within each of a plurality of media content access devices; and
a media content watch list subsystem configured to communicate with the plurality of media content access devices;
wherein the media content watch list subsystem
receives media content watch list data from the plurality of media content access devices, the media content watch list data representing a plurality of media content instances accessible by one or more of the plurality of media content access devices,
aggregates the media content watch list data received from the plurality of media content access devices,
continually and automatically updates the media content watch list data based on one or more watch list update messages received from one or more of the plurality of media content access devices by performing one or more update operations to the media content watch list data,
receives a request for a media content watch list from a media content access device included in the plurality of media content access devices,
generates the media content watch list based on the media content watch list data, and
transmits data representative of the media content watch list to the media content access device from which the request is received for presentation to the user, and
wherein each watch list client facility within each of the plurality of media content access devices is configured to
provide, for presentation by each of the plurality of media content access devices, a graphical user interface including one or more tools configured to facilitate a user configuration of automatic updates to media content watch list data maintained by the media content watch list subsystem in response to performance, by each of the plurality of media content access devices, of one or more non-watch-list-specific operations included in a plurality of non-watch-list-specific operations, the one or more tools comprising
a list of non-watch-list-specific operations and a plurality of user selectable options each corresponding to a non-watch-list-specific operation included in the list of non-watch-list-specific operations, and
a list of update operations and a plurality of additional user selectable options each corresponding to an update operation included in the list of update operations,
detect a user selection of at least one of the user selectable options corresponding to at least one of the non-watch-list-specific operations included in the list of non-watch-list-specific operations,
configure, in response to the user selection of the at least one of the user selectable options corresponding to the at least one of the non-watch-list-specific operations, the at least one of the non-watch-list-specific operations as at least one predetermined non-watch-list-specific operation such that a performance of the at least one predetermined non-watch-list-specific operation by a corresponding media content access device is configured to automatically trigger an update to the media content watch list data,
detect a user selection of at least one of the additional user selectable options corresponding to at least one of the update operations included in the list of update operations, and
configure, in response to the user selection of the at least one of the additional user selectable options, the at least one of the update operations to be performed in response to the performance of the at least one predetermined non-watch-list-specific operation by the corresponding media content access device.

17. The system of claim 16, wherein each watch list facility within each of the plurality of media content access devices is further configured to
detect a performance of the at least one predetermined non-watch-list-specific operation by the corresponding media content access device,
automatically generate, in response to the detection of the performance of the at least one predetermined non-watch-list-specific operation by the corresponding media content access device, the update to the media content watch list data, and
initiate a transmission of an update message to the media content watch list subsystem, the update message configured to direct the media content watch list subsystem to perform the at least one of the update operations to the media content watch list data.

* * * * *